United States Patent
Morris et al.

(10) Patent No.: US 11,261,574 B1
(45) Date of Patent: Mar. 1, 2022

(54) CASSETTE

(71) Applicant: Emrgy Inc., Atlanta, GA (US)

(72) Inventors: Emily A. Morris, Atlanta, GA (US); Craig J. Cochran, Atlanta, GA (US); Madeleine M. White, Atlanta, GA (US); Kirk William Charles, Austell, GA (US); Thorsten Stoesser, London (GB); Stefan Runge, Cardiff (GB)

(73) Assignee: EMRGY INC., Atlanta, GA (US)

( * ) Notice: Subject to any disclaimer, the term of this patent is extended or adjusted under 35 U.S.C. 154(b) by 0 days.

(21) Appl. No.: 16/447,694

(22) Filed: Jun. 20, 2019

Related U.S. Application Data

(60) Provisional application No. 62/687,520, filed on Jun. 20, 2018.

(51) Int. Cl.
*F01D 25/28* (2006.01)
*E02B 9/04* (2006.01)
*F03B 13/00* (2006.01)

(52) U.S. Cl.
CPC ............... *E02B 9/04* (2013.01); *F03B 13/00* (2013.01)

(58) Field of Classification Search
CPC .......... E02B 9/04; F03B 13/00; F01D 25/285; F05D 2230/64; F05D 2230/642; F05D 2230/644; F05D 2230/68
USPC ............................... 415/126, 213, 214.1, 232
See application file for complete search history.

(56) References Cited

U.S. PATENT DOCUMENTS

| | | | |
|---|---|---|---|
| 6,109,863 A | 8/2000 | Milliken | |
| 6,320,273 B1 | 11/2001 | Nemec | |
| 6,793,458 B2 * | 9/2004 | Kawai | F01D 25/28 415/213.1 |
| 7,944,075 B2 | 5/2011 | Boone | |
| 8,246,299 B2 * | 8/2012 | Razzell | F01D 11/005 415/173.1 |

(Continued)

FOREIGN PATENT DOCUMENTS

| | | |
|---|---|---|
| CN | 103001454 A | 3/2013 |
| CN | 104393725 A | 3/2015 |

(Continued)

OTHER PUBLICATIONS

International Search Report and Written Opinion dated Dec. 22, 2016 for International Application No. PCT/US2016/057130.

(Continued)

*Primary Examiner* — Edwin J Toledo-Duran
(74) *Attorney, Agent, or Firm* — Morris, Manning & Martin, LLP; Bryan D. Stewart

(57) ABSTRACT

An exemplary turbine system for generating hydroelectric power. The exemplary turbine system is generally installed in shallow waterways and accelerates water flowing therein. The accelerated water generates power via spinning one or more turbine rotors of the system. An exemplary method for installing the turbine system is disclosed. The method includes first lowering a turbine system base into the shallow waterway, where the base includes a depression for accepting a mortise insert. The mortise insert includes one or more sockets for accepting notches in a base plate, where the base plate is coupled to one or more turbine rotors. The base plate mates with the mortise insert for ease of installation and securely positioning the one or more turbine rotors within the system.

14 Claims, 36 Drawing Sheets

(56) References Cited

U.S. PATENT DOCUMENTS

| | | | |
|---|---|---|---|
| 8,616,829 B2 | 12/2013 | Becker et al. | |
| 8,807,917 B2* | 8/2014 | Park | F03D 13/10 |
| | | | 415/4.2 |
| 8,840,364 B2* | 9/2014 | Warton | F01D 25/285 |
| | | | 415/126 |
| 8,876,448 B1* | 11/2014 | Hess | B60P 7/06 |
| | | | 410/46 |
| 9,337,712 B2 | 5/2016 | Storaasli | |
| 9,618,002 B1* | 4/2017 | Cabra | F03B 13/00 |
| 10,458,386 B2 | 10/2019 | Watanabe et al. | |
| 2002/0197147 A1* | 12/2002 | Kawai | F16M 7/00 |
| | | | 415/1 |
| 2004/0232702 A1 | 11/2004 | He et al. | |
| 2007/0020097 A1* | 1/2007 | Ursua | F03B 17/063 |
| | | | 415/213.1 |
| 2007/0063520 A1 | 3/2007 | Ahmad | |
| 2008/0018115 A1 | 1/2008 | Orlov | |
| 2008/0084067 A1 | 4/2008 | Hill | |
| 2008/0267777 A1* | 10/2008 | Lux | F03D 3/065 |
| | | | 416/132 B |
| 2009/0091135 A1* | 4/2009 | Janca | F03B 17/062 |
| | | | 290/54 |
| 2009/0129928 A1 | 5/2009 | Sauer | |
| 2009/0167028 A1* | 7/2009 | Akamine | F03D 3/062 |
| | | | 290/55 |
| 2009/0230686 A1 | 9/2009 | Catlin | |
| 2009/0315329 A1 | 12/2009 | Duffey et al. | |
| 2010/0032952 A1 | 2/2010 | Hatch et al. | |
| 2010/0084862 A1 | 4/2010 | Unno | |
| 2010/0194112 A1 | 8/2010 | Vince | |
| 2010/0253081 A1* | 10/2010 | Schlabach | F03B 13/00 |
| | | | 290/54 |
| 2010/0295316 A1* | 11/2010 | Grassman | F03D 13/20 |
| | | | 290/55 |
| 2011/0037333 A1 | 2/2011 | Atallah et al. | |
| 2011/0254271 A1 | 10/2011 | Freeman et al. | |
| 2012/0223606 A1 | 9/2012 | Storaasli | |
| 2013/0069369 A1 | 3/2013 | Salehpoor | |
| 2013/0071240 A1 | 3/2013 | Chir et al. | |
| 2013/0115045 A1 | 5/2013 | Korac | |
| 2013/0134815 A1 | 5/2013 | Powell et al. | |
| 2013/0266378 A1 | 10/2013 | French, Sr. | |
| 2013/0285383 A1 | 10/2013 | Belarbi | |
| 2013/0285384 A1 | 10/2013 | Schultz et al. | |
| 2013/0334825 A1 | 12/2013 | Roter et al. | |
| 2014/0138954 A1 | 5/2014 | Antonucci et al. | |
| 2014/0161642 A1 | 6/2014 | Rajadhyaksha et al. | |
| 2014/0183996 A1 | 7/2014 | He et al. | |
| 2014/0265335 A1 | 9/2014 | Andreis et al. | |
| 2015/0226174 A1 | 8/2015 | Duchene et al. | |
| 2015/0343674 A1* | 12/2015 | Lowth | F01D 5/005 |
| | | | 264/494 |
| 2016/0010620 A1 | 1/2016 | Han | |
| 2016/0049855 A1 | 2/2016 | Davey et al. | |
| 2017/0054384 A1 | 2/2017 | Post | |
| 2017/0138333 A1 | 5/2017 | Toran | |
| 2017/0298748 A1* | 10/2017 | Vetters | F01D 25/005 |
| 2018/0106236 A1 | 4/2018 | Lee | |
| 2020/0025040 A1* | 1/2020 | Meyer | F04D 29/644 |

FOREIGN PATENT DOCUMENTS

| | | |
|---|---|---|
| EP | 1849999 A2 | 10/2007 |
| GB | 2408778 A | 6/2005 |
| RU | 2216662 C1 | 11/2003 |
| WO | 2006133703 A1 | 12/2006 |
| WO | 2011095240 A2 | 8/2011 |
| WO | 2011160210 A2 | 12/2011 |
| WO | 2013143596 A1 | 10/2013 |
| WO | 2016004506 A1 | 1/2016 |

OTHER PUBLICATIONS

Davey, "Axial Flux Cycloidal Magnetic Gears", IEEE Transactions on Magnetics 50:4, 2014, 8100607, 7 pages.

International Search Report and Written Opinion dated Jan. 3, 2019 for International Application No. PCT/US2018/051371.

International Search Report and Written Opinion dated Jun. 22, 2017 for International Application No. PCT/US17/24511.

Extended European Search Report dated Oct. 28, 2019 for European Pat. Appl. No. 17776448.7.

International Search Report & Written Opinion dated May 27, 2020 for International PCT Patent Appl. No. PCT/US2020/023693.

* cited by examiner

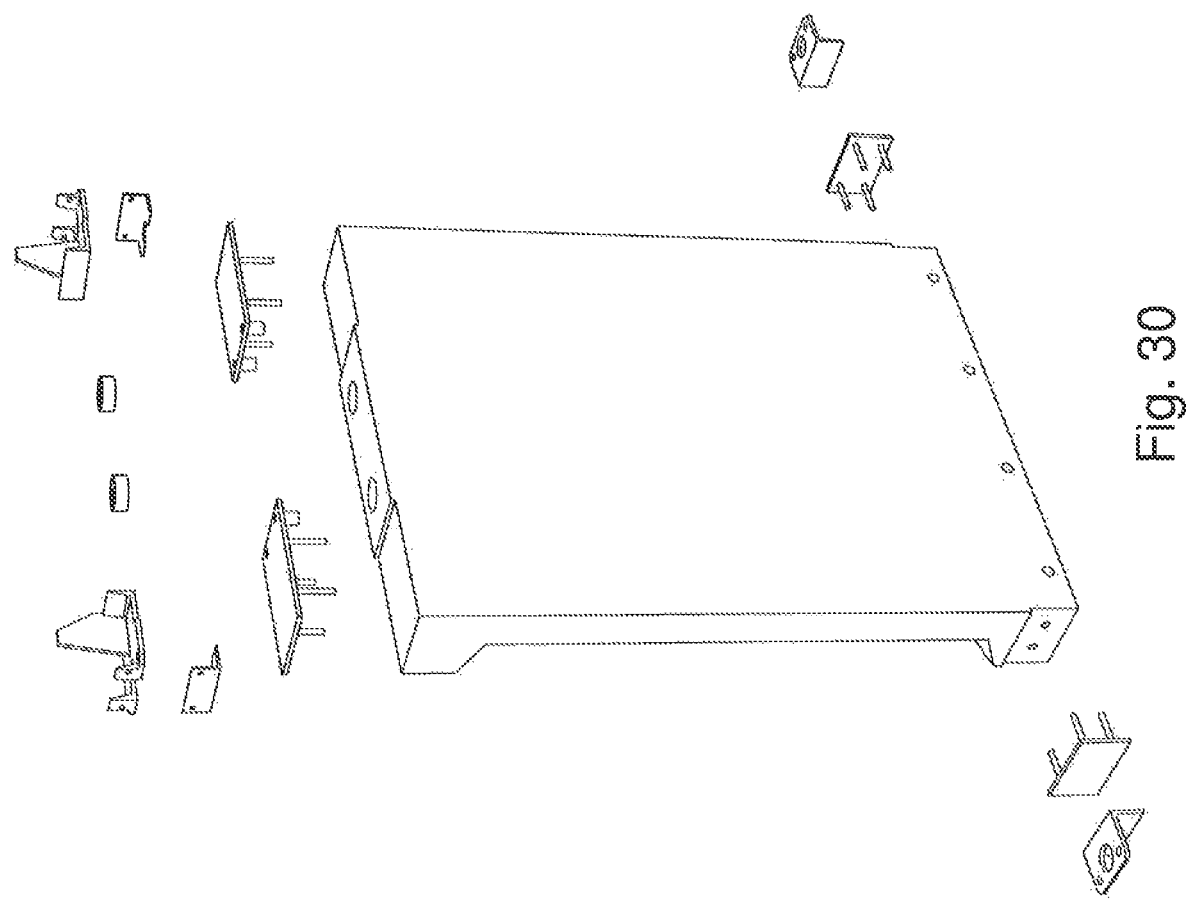

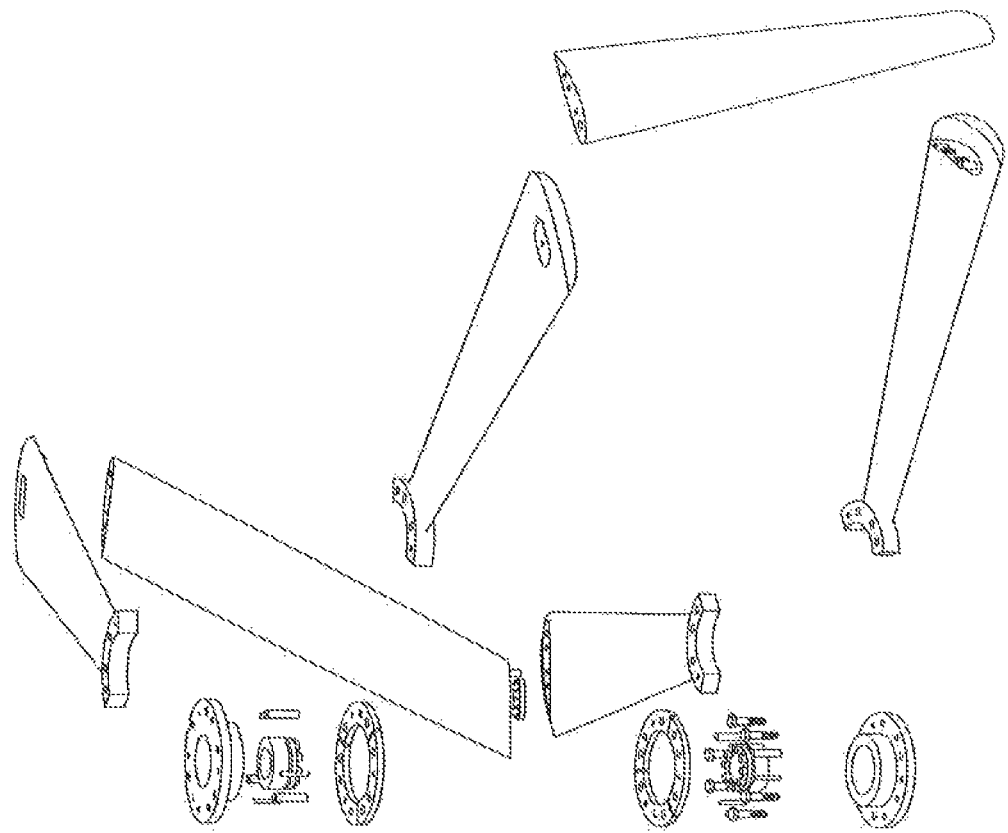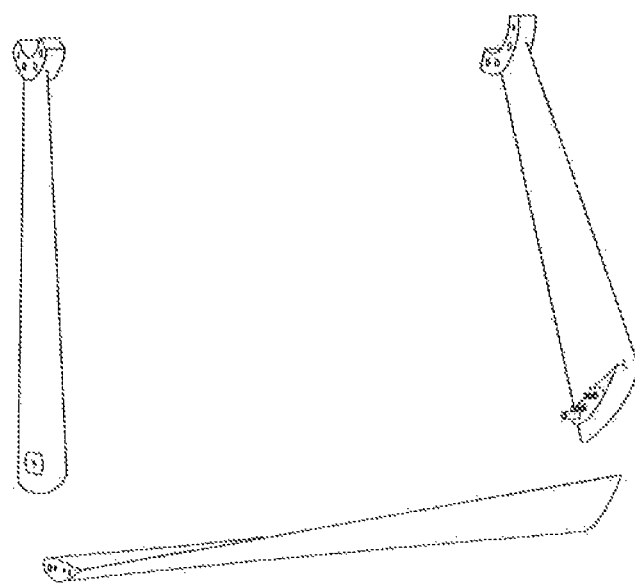
Fig. 39

CASSETTE

CROSS REFERENCE TO RELATED APPLICATIONS

This application claims the benefit of, and priority to, U.S. Provisional Patent Application No. 62/687,520, filed on Jun. 20, 2018, and entitled "CASSETTE," the disclosure of which is incorporated by reference in its entirety as if the same were fully disclosed herein.

TECHNICAL FIELD

The present disclosure relates generally to shallow waterway power generation systems and methods for installing the same.

BACKGROUND

Traditional hydroelectric systems are generally integrated with damns or similar structures for manipulating large bodies of water. These hydroelectric systems are generally built simultaneously with their respective water manipulation structures, and are built at the location where they are to operate. Therefore, there exists a long-felt but unresolved need for hydroelectric systems that are easier to manufacture and install, and may be installed in various waterways, rather than only larger water manipulation structures.

BRIEF SUMMARY OF THE DISCLOSURE

In various embodiments, the present disclosure relates generally to shallow waterway power generation systems and apparatuses, and methods for installing shallow waterway power generation systems and apparatuses. In one embodiment, to install an exemplary power generation apparatus, a base is first lowered into a desired shallow waterway location. In some embodiments, the base may include hooks or latches for allowing a crane, or similar equipment, to securely hoist the base and lower the base into the desired position. In particular embodiments, the base includes an obround depression for accepting a mortise insert. Generally, a mortise is a socket or similar receptacle for receiving a tenon, where the tenon is shaped to fit securely within the mortise without the need for additional hardware or adhesives. According to various aspects of the present disclosure, the mortise insert may be positioned within the obround depression of the base for accepting portions of other components/modules of the shallow waterway power generation system. For example, the mortise insert may accept knobs protruding from the bottom of one or more turbine rotors (or a plate coupled to the bottom of the rotors), thus securing the turbine rotors. In general, including a mortise insert to accept and secure other modules of the system provides advantages over prior systems and apparatus, namely: 1) reductions to installation time; 2) ease of repairs to, or replacement of, turbines; 3) reductions to vulnerabilities (such as erosion) to the apparatus base, since the mortise insert eliminates the need for drilling screws into the base for securing the turbine rotors (and other components).

In various embodiments, other modules of the system may be installed similarly to the base. For example, the system may include sidewalls, where the sidewalls are lowered in position to the right and/or left of the base, and are secured via one or more metal brackets. Furthermore, in one embodiment, the system may include a top frame spanning about the length of the base, where the top frame is secured to the system via one or more metal brackets along the top surfaces of the sidewalls.

In particular embodiments, the base and other system modules may be manufactured from concrete or another cement mixture, and thus industrial equipment (e.g., a crane) is generally used for hoisting and lowering the modules into the shallow waterway. In various embodiments, the base and other modules may include one or more hooks, latches, or sockets for allowing a crane, or the like, to hoist the modules in a suspended state prior to lowering and positioning the modules in the waterway.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 30: A perspective view of a disassembled side wall and hardware.

FIGS. 37-39: Disassembled views of the exemplary turbine and blades.

DETAILED DESCRIPTION

Figure 1:
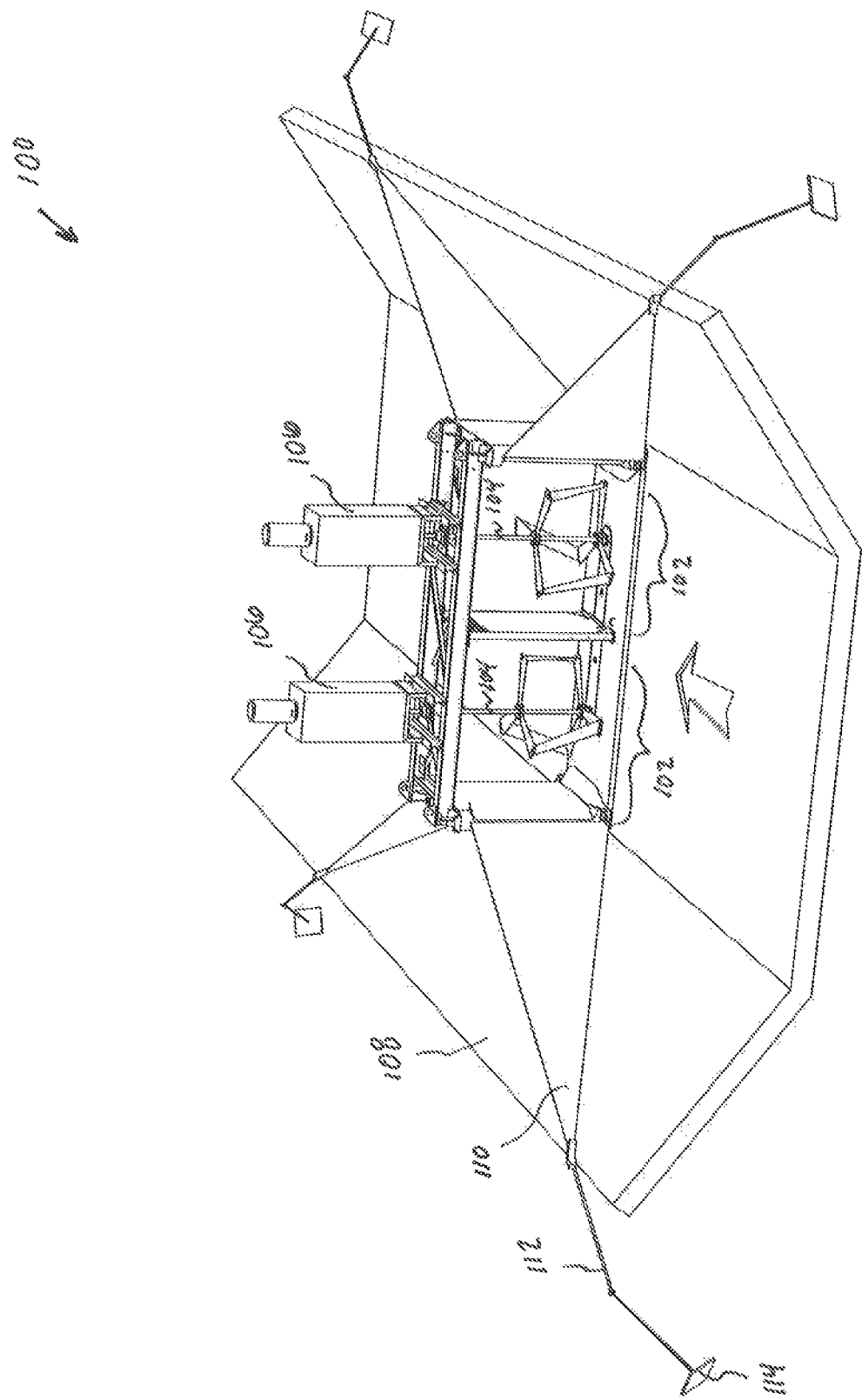
FIG. 1: A perspective view of the cassette system installed with side panels.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

In various embodiments, the present disclosure relates generally to shallow waterway power generation systems and apparatuses, and methods for installing shallow waterway power generation systems and apparatuses. In one embodiment, to install an exemplary power generation apparatus, a base is first lowered into a desired shallow waterway location. In some embodiments, the base may include hooks or latches for allowing a crane, or similar equipment, to securely hoist the base and lower the base into the desired position. In particular embodiments, the base includes an obround depression for accepting a mortise insert. Generally, a mortise is a socket or similar receptacle for receiving a tenon, where the tenon is shaped to fit securely within the mortise without the need for additional hardware or adhesives. According to various aspects of the present disclosure, the mortise insert may be positioned within the obround depression of the base for accepting portions of other components/modules of the shallow waterway power generation system. For example, the mortise insert may accept knobs protruding from the bottom of one or more turbine rotors (or a plate coupled to the bottom of the rotors), thus securing the turbine rotors. In general, including a mortise insert to accept and secure other modules of the system provides advantages over prior systems and apparatus, namely: 1) reductions to installation time; 2) ease of repairs to, or replacement of, turbines; 3) reductions to vulnerabilities (such as erosion) to the apparatus base, since the mortise insert eliminates the need for drilling screws into the base for securing the turbine rotors (and other components).

In various embodiments, other modules of the system may be installed similarly to the base. For example, the system may include sidewalls, where the sidewalls are lowered in position to the right and/or left of the base, and are secured via one or more metal brackets. Furthermore, in one embodiment, the system may include a top frame spanning about the length of the base, where the top frame is secured to the system via one or more metal brackets along the top surfaces of the sidewalls.

In particular embodiments, the base and other system modules may be manufactured from concrete or another cement mixture, and thus industrial equipment (e.g., a crane) is generally used for hoisting and lowering the modules into the shallow waterway. In various embodiments, the base and other modules may include one or more hooks, latches, or sockets for allowing a crane, or the like, to hoist the modules in a suspended state prior to lowering and positioning the modules in the waterway.

Figure 2:
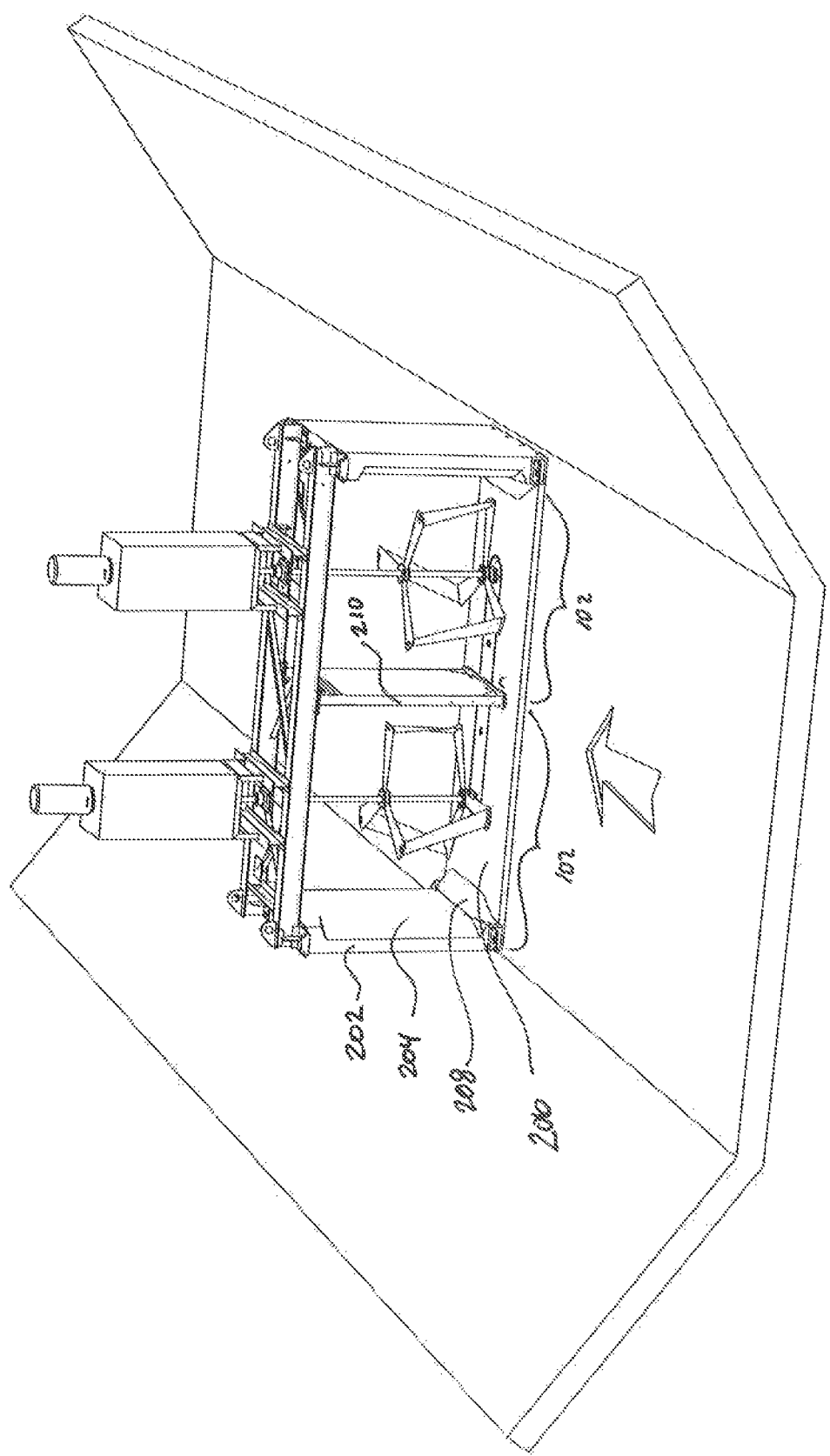
FIG. 2: A perspective view of the cassette system installed without side panels.

Turning now to the drawings, FIG. 1 illustrates the exemplary cassette turbine system 100, according to one aspect of the present disclosure. As is described in the PCT Patent App. No. PCT/US2017/024511, filed Mar. 28, 2017, entitled Turbine Hydrokinetic Energy System Utilizing Cycloidal Magnetic Gears, which is incorporated by reference in its entirety herein, turbine systems such as the cassette turbine system described herein may be fitted into shallow waterways for generating hydroelectric energy. As shown in the present embodiment, the system 100 includes one or more modules 102 that each include a rotor 104 and corresponding gear system 106 for generating hydroelectric energy in response to the rotation of the rotors 104 as a result of fluid flowing through the modules 102. Referring to the present embodiment, consider an example where the system 100 is installed within the channel 108. In this scenario, two modules 102 are installed side-by-side in the channel 108 and a plurality of side panels 110 are installed at the corners of the system 100 for directing fluid through the one or more modules 102 and preventing fluid from flowing around the modules 102. In various embodiments, the side panels 110 are positioned in an upright or taught position via a cable 112 secured to an anchor 114. However, some embodiments (as shown in FIG. 2) allow for the system 100 to be installed without side panels 110. According to various aspects of the present disclosure, the configuration shown in the present embodiment allows for varying depths of fluid (e.g., water flowing at a depth of 1 ft, 3 ft, 6 ft, etc.) to flow through a channel and be directed into the one or more modules 102 of the system 100, which in turn rotates the rotors 104 for generating power at the gear systems 106. As will be described in greater detail herein, particular shapes and form factors of individual components of the system generate increased speed of fluid flow through the one or more modules 102, thereby resulting in an increased amount of power generation. Furthermore, unique and novel components of the system are described herein for allowing improved and enhanced installation techniques and methods.

In one embodiment, FIG. 2 illustrates the exemplary system 100 without side panels 110, according to one aspect of the present disclosure. As shown in the embodiment of FIG. 2, the system 100 includes a particular leading edge 202, one or more convex side walls 204, base 206, and base molding 206. In various embodiments, these components and features of the system 100, as well as the module divider 210, are uniquely shaped for increasing the fluid velocity through the one or more modules 102. For example, as fluid enters the one or more modules 102, the shape of the leading edge 202, the convex side wall 204, the base 206, and the base molding 208 act as a narrowing mouth, which, due to the narrowing form factor, accelerates the speed of the fluid through the one or more modules 102, as is known to occur in Venturi tubes.

Figure 3:
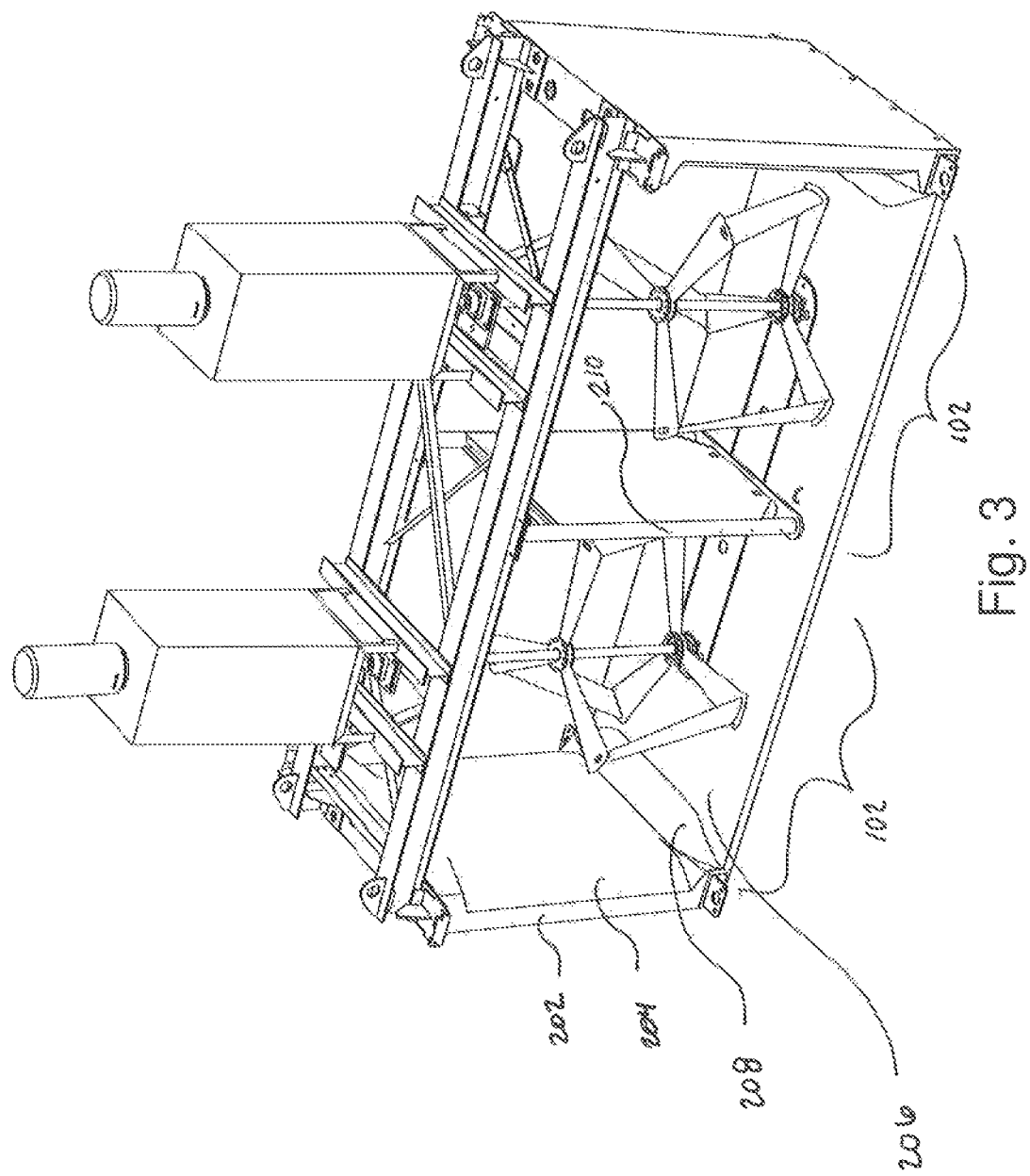
FIG. 3: A perspective view of the cassette system.

FIG. 3 is view of the system 100 without the side panels 110, illustrating the narrowing mouth form factor of the system 100, according to one aspect of the present disclosure. As shown in the present embodiment, the convex side wall 204 provides a curved inner surface of the module 102, where the midpoint of the side wall 204 is the furthest point of extension of the wall into the central volume of the module 102. In various embodiments, the extension of the convex side wall into the central volume of the module 102 decreases closer to the leading edge 202. At the corners between the convex side walls 202 and the base 206 is the base molding 208. As shown in the present embodiment, the base molding 208 also includes a curved design where the curve narrows to a point at the leading edge 202 of the one or more modules 102. In particular embodiments, the unique form factor of the convex side walls 202 as well as the base molding 208 gradually decreases the available cross sectional area through which fluid may flow. Accordingly, in various embodiments, the unique form factor of these components facilitates an accelerated fluid flow through the one or more modules 102, thereby allowing the rotors 104 to spin at faster speeds and as a result generate more energy. In one embodiment, the base 206 of the one or more modules 102 is also shaped convexly, which allows for the base 206 to exhibit similar fluid acceleration properties as the convex side wall 204 and the base molding 208. The shape of the base 206 will be described further below in the discussion of FIG. 4. Continuing with FIG. 3, and mentioned briefly above in the discussion of FIG. 2, the shape of the module divider 210 may contribute to the acceleration of the fluid flow through the one or more modules 102. As shown in the present embodiment, the module divider 210 includes a curved front-facing shape which cuts through the fluid with minimal disruption. In various embodiments, separating the fluid into the one or more modules 102 without creating turbulence in the fluid allows for the turbine 104 of each module 102 to efficiently convert the kinetic energy from the fluid into electricity. Furthermore, it should be understood that in various embodiments the system 100 may include as many module dividers 210 as appropriate based on the number of modules 102 and corresponding turbines 104.

Figure 4:
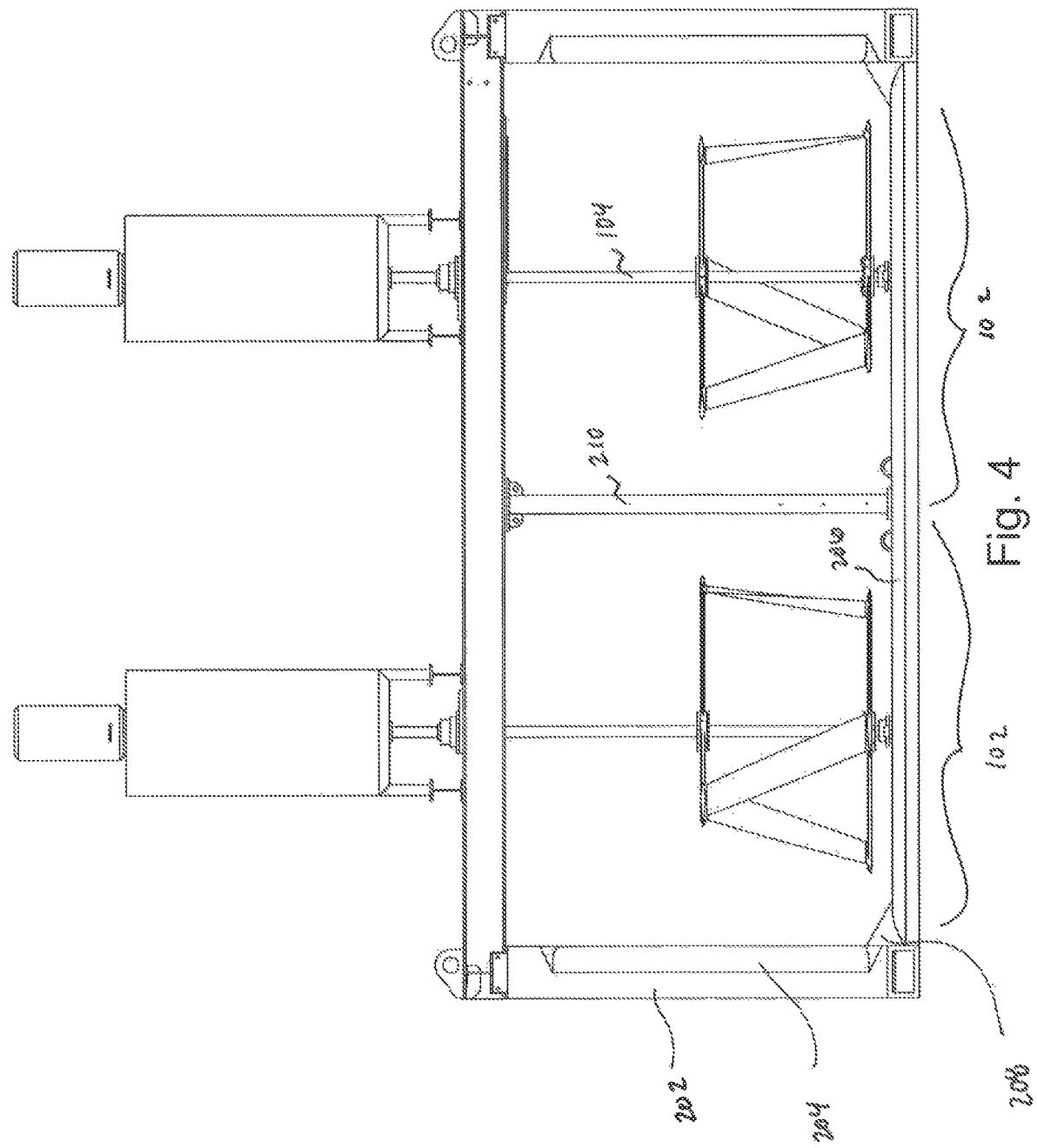
FIG. 4: A front view of the cassette system.

FIG. 4 illustrates a front view of the system 100, according to one aspect of the present disclosure. As shown in the present embodiment, the base 206 of the one or more modules 102 includes a convex shape. In at least one embodiment, similar to the convex shape of the side walls 204 and the base molding 208, the base 206 directs fluid flowing near the bottom of the system 100 upward and into the one or more modules 102. Furthermore, and according to particular embodiments, the convex shape of the base 206 facilitates the acceleration of the fluid resulting in faster turbine 104 speeds, more turbine 104 rotations, and therefore more energy generated.

Figure 5:
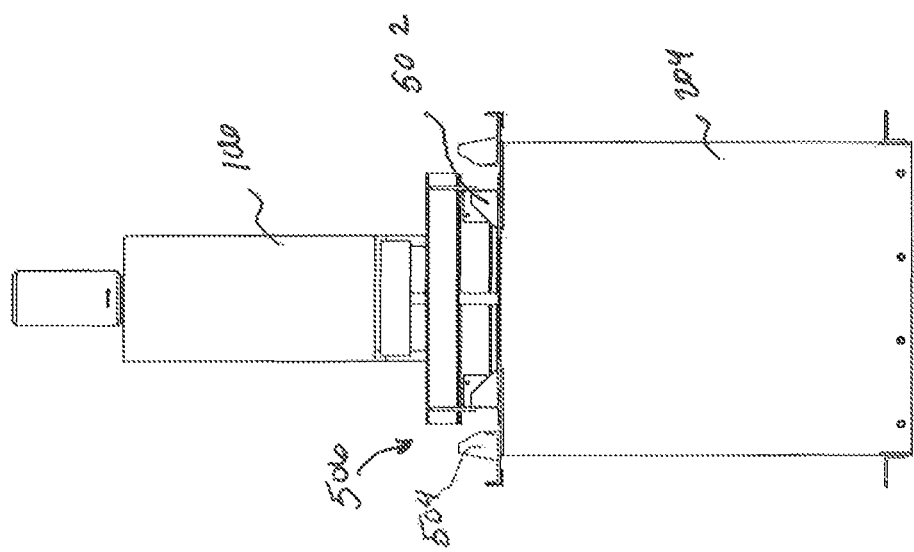
FIG. 5: A side view of the cassette system.

FIG. 5 illustrates a side view of the system 100, according to one aspect of the present disclosure. As shown in the present embodiment, the turbine gear system 106 is mounted upon a mounting frame 502. The mounting frame 502 may be manufactured of steel, or another appropriate metal or alloy, or reinforced concrete and the mounting frame may be securely attached to the top of the convex side wall 204, which may be manufactured of concrete, cement, or another non-metal material. In one embodiment, brackets 504 may be securely attached to the convex side walls 204 at the corners of the walls 204. In some embodiments, the mounting frame 502 and the bracket 504 may create a guided mounting slot 506 for guiding the mounting frame into the proper location during installation (e.g., in a channel or on a landing zone). The installation process of these components, as well as the benefits provided by their design, will be discussed in greater detail herein.

Figure 6:
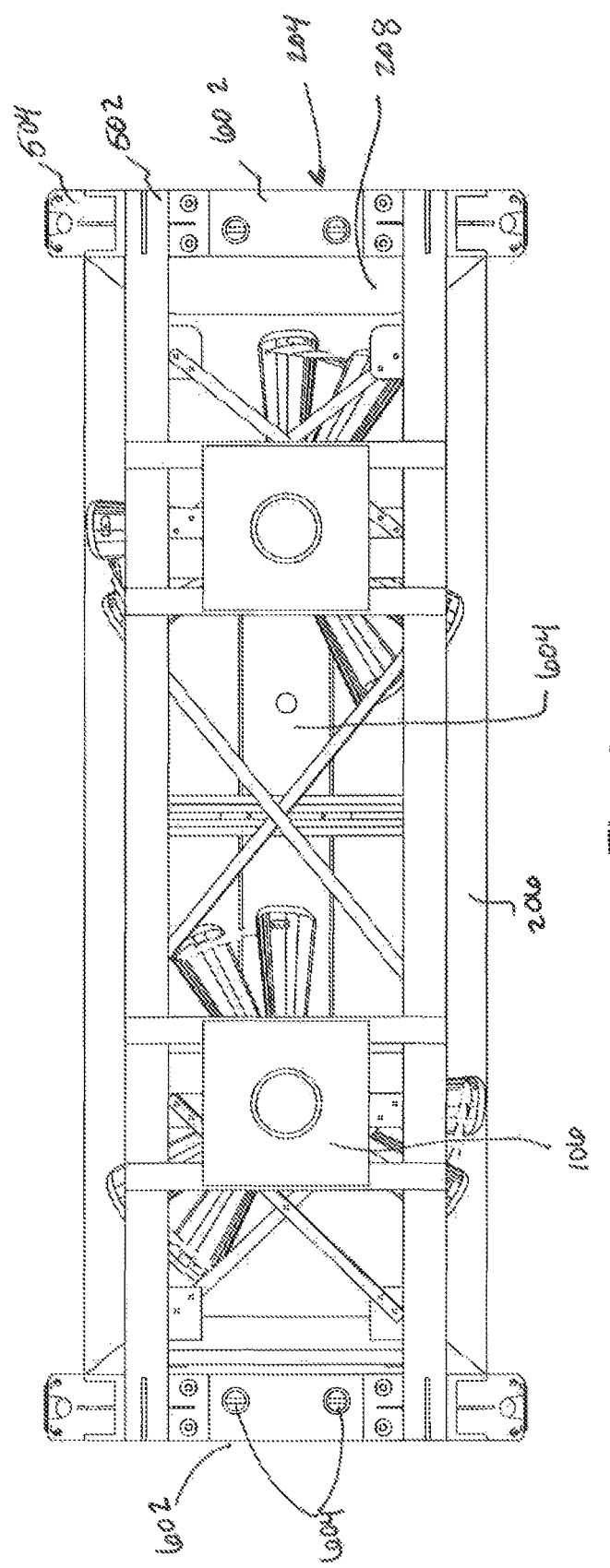
FIG. 6: A top view of the cassette system.

FIG. 6 illustrates a top view of the system 100, according to one aspect of the present disclosure. As shown in the present embodiment, the mounting frame 502 is securely attached to the top surface 602 of the convex side wall 204, where the mounting frame 502 is secured at least by the brackets 504 and additional bolts 604. In particular embodiments, the mounting frame 502, as well as the turbines 104, gear systems 106, and module dividers 210 are installed separately from the convex side wall and the bottom (e.g., the substantially concrete sections) and are then securely attached to the convex side wall 204.

In particular embodiments, a mortise insert plate 604 is securely attached to the bottom portions of the turbines 104 and one or more module dividers 210 for securing these components as well as enhancing the installation process of the system 100. In various embodiments, the mortise insert plate 604 includes one or more inserts (not shown) that may be accepted by holes or slots in a depression in the surface of the base 206. The functionality and benefits of the mortise insert plate 604 will be discussed in greater detail below.

Figure 7:
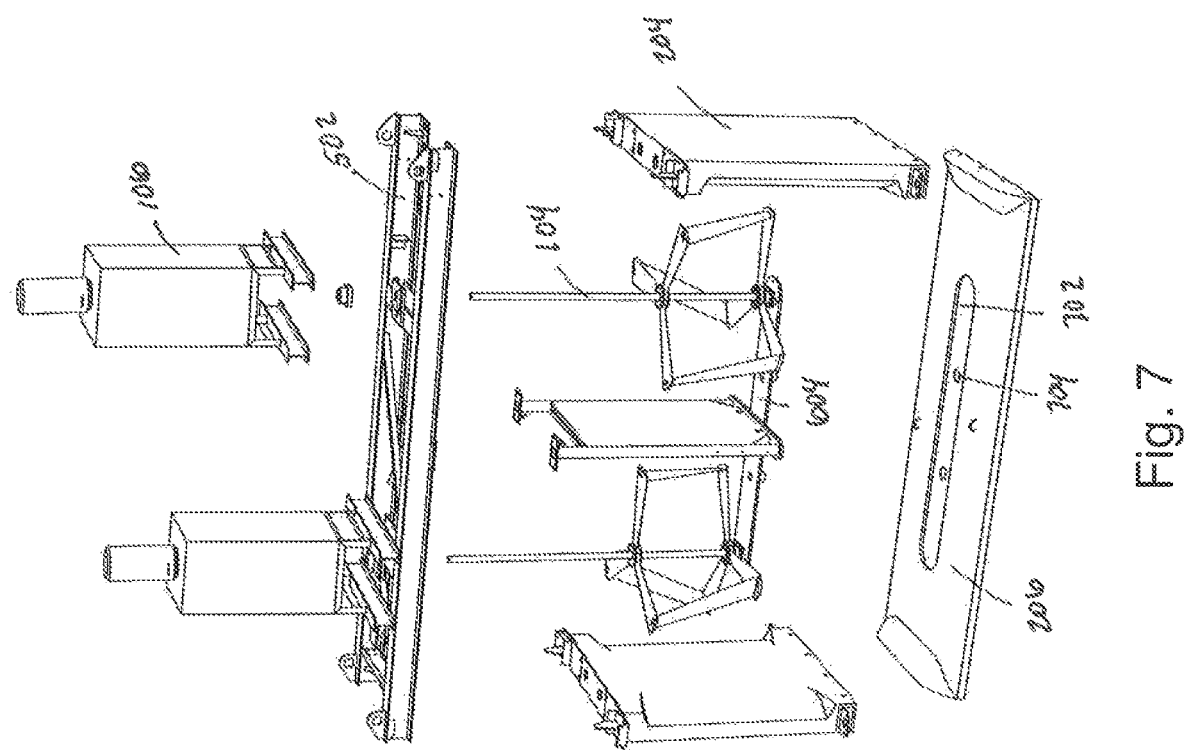
FIG. 7: A disassembled perspective view of the cassette system.

Turning now to FIG. 7, an exploded and disassembled view of the system 100 is shown, according to one aspect of the present disclosure, illustrating the modular aspects of the system 100. For example, the gear system 106 is shown in both an assembled and disassembled state on the mounting frame. In various embodiments, the gear system 106 may be manufactured and assembled independently from and in a different geographical location the other components of the system 100. Furthermore, the present embodiment illustrates the depression 702 mentioned briefly above in the description of FIG. 6. In one embodiment, the depression 702 is obround in shape and accommodates the shape of the mortise insert plate 604. In particular embodiments, when installing the system 100, the gear system 106, turbines 104, mounting frame 502, module dividers 210, and the mortise insert plate 604 may be lowered as one assembled piece and portions of the mortise insert plate 604 may fit into the depression 702. As shown in the present embodiment, insert notches 704 are included within the depression 702 for receiving one or more knobs protruding from the bottom of the mortise insert plate 604.

Figure 8:
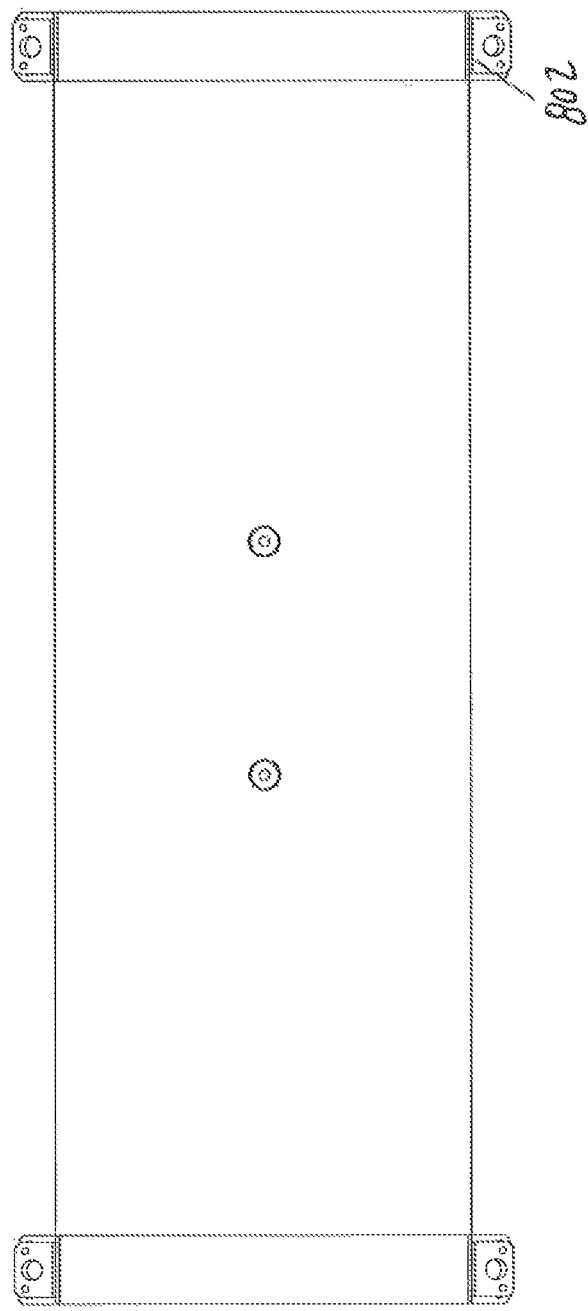
FIG. 8: A bottom view of the cassette system.

In one embodiment, FIG. 8 illustrates a bottom view of the base 206. In some embodiments, the bottom of the base 206 may rest on a flat surface such as a canal or shallow water channel. As shown in the present embodiment, the bottom portions of the insert notches 704 are shown.

Figure 9:
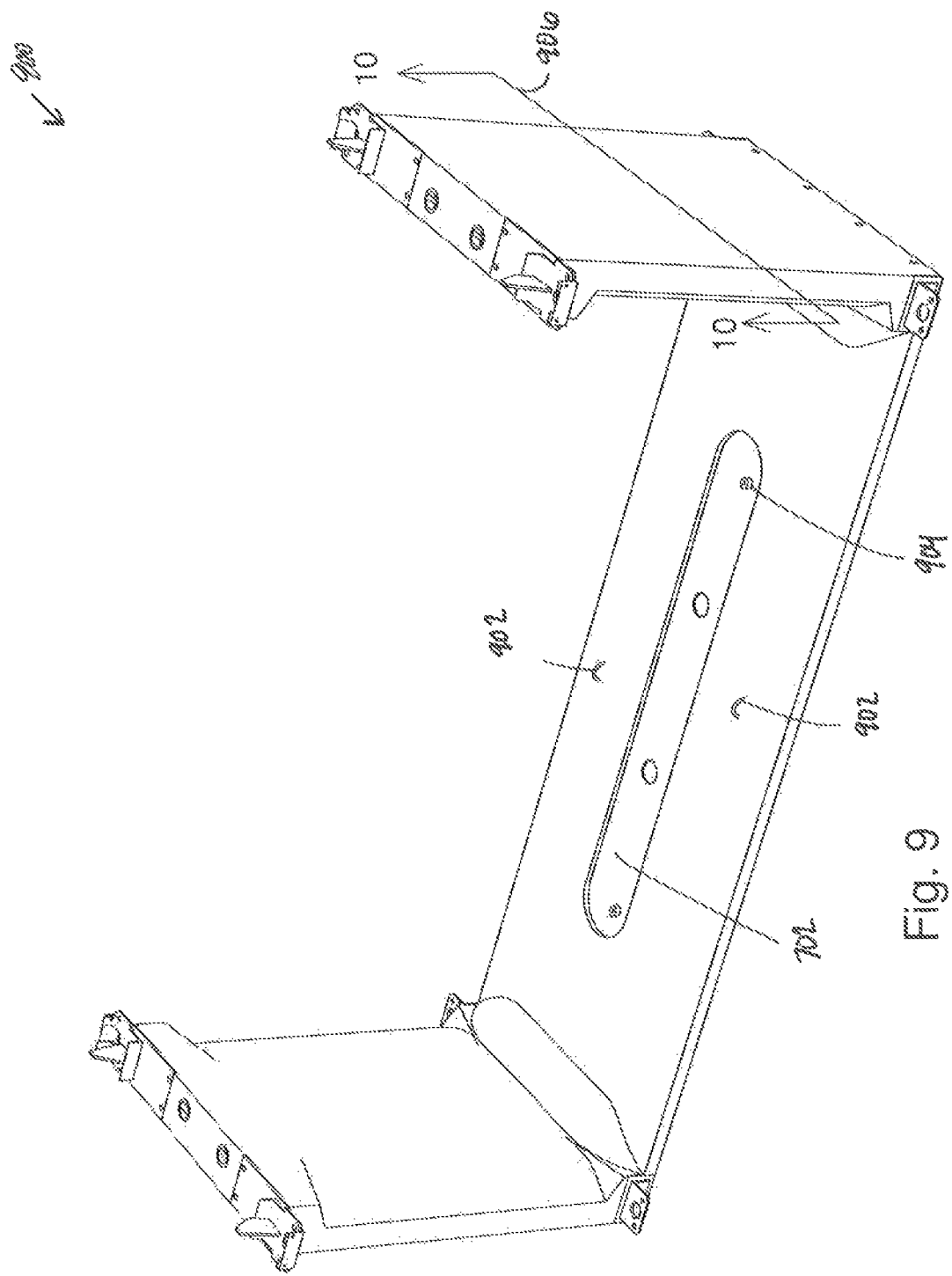
FIG. 9: A perspective view of the cassette system base and walls, indicating a cross-sectional plane.

FIG. 9 is a perspective view of the base and convex side walls, together forming the non-metal assembly 900, according to one aspect of the present disclosure. In various embodiments, the base and convex side walls included in the non-metal assembly 900 are manufactured of concrete, cement mixture, or another similar non-metal material. The non-metal assembly 900 may be installed into a canal or shallow water channel as shown in channel shown in FIG. 1, and the non-mental assembly may be lowered via the eyes 902 or other components shown in FIG. 9, such as, for example, one or more hooks/connectors located at the top of the convex sidewall 204 (not labeled in FIG. 9). In various embodiments, industrial equipment such as cranes may attach devices such as carabiners to various portions of the non-metal assembly 900 for connecting to the non-metal assembly 900 during the lowering process (e.g., when installing the assembly 900 into a waterway, channel, or the like). Once the non-mental assembly 900 is installed into the channel, the metal components of the system 100 may be installed. Shown in the present embodiment is a line 906 indicating a cross sectional path which is shown in FIG. 10 and described below.

Figure 10:
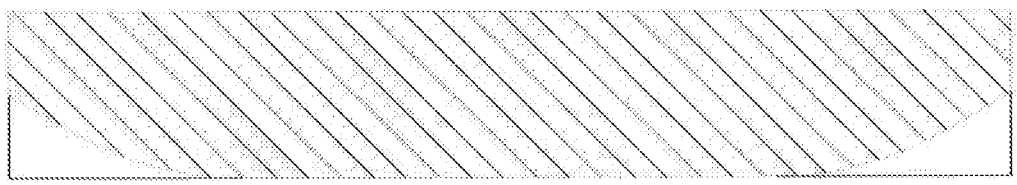
FIG. 10: A cross-sectional view of the cassette system side wall.
Figure 11:
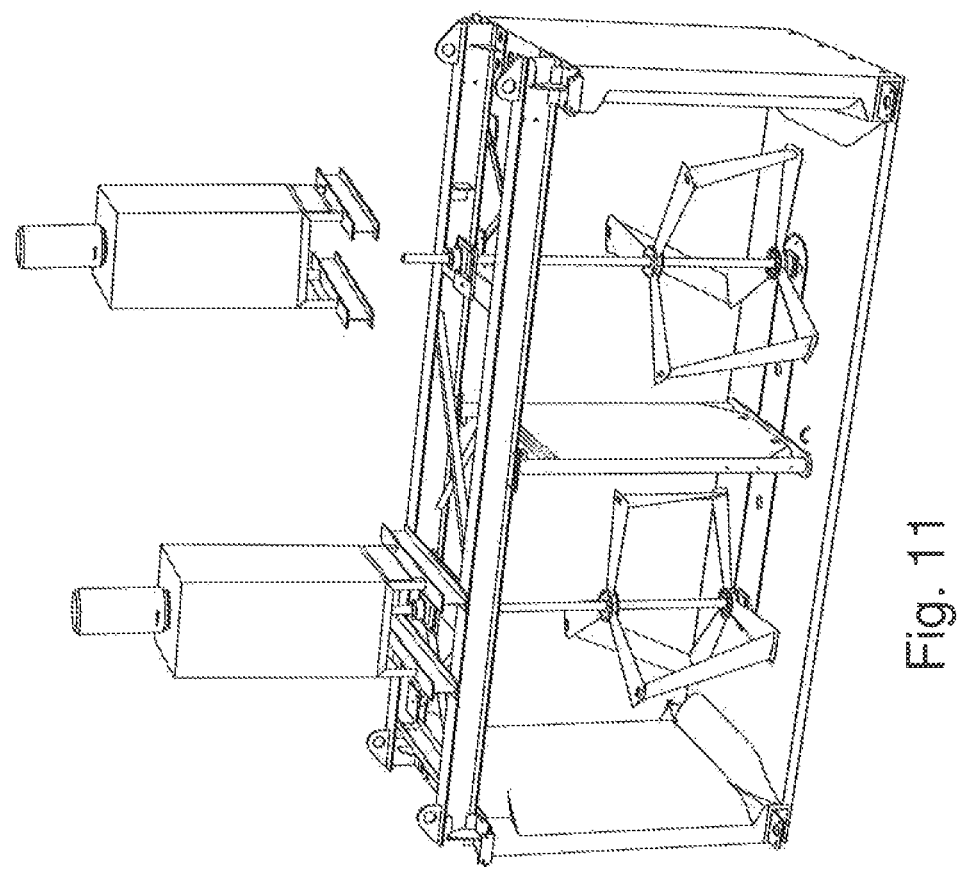
FIG. 11: A perspective view of the cassette system.
Figure 12:
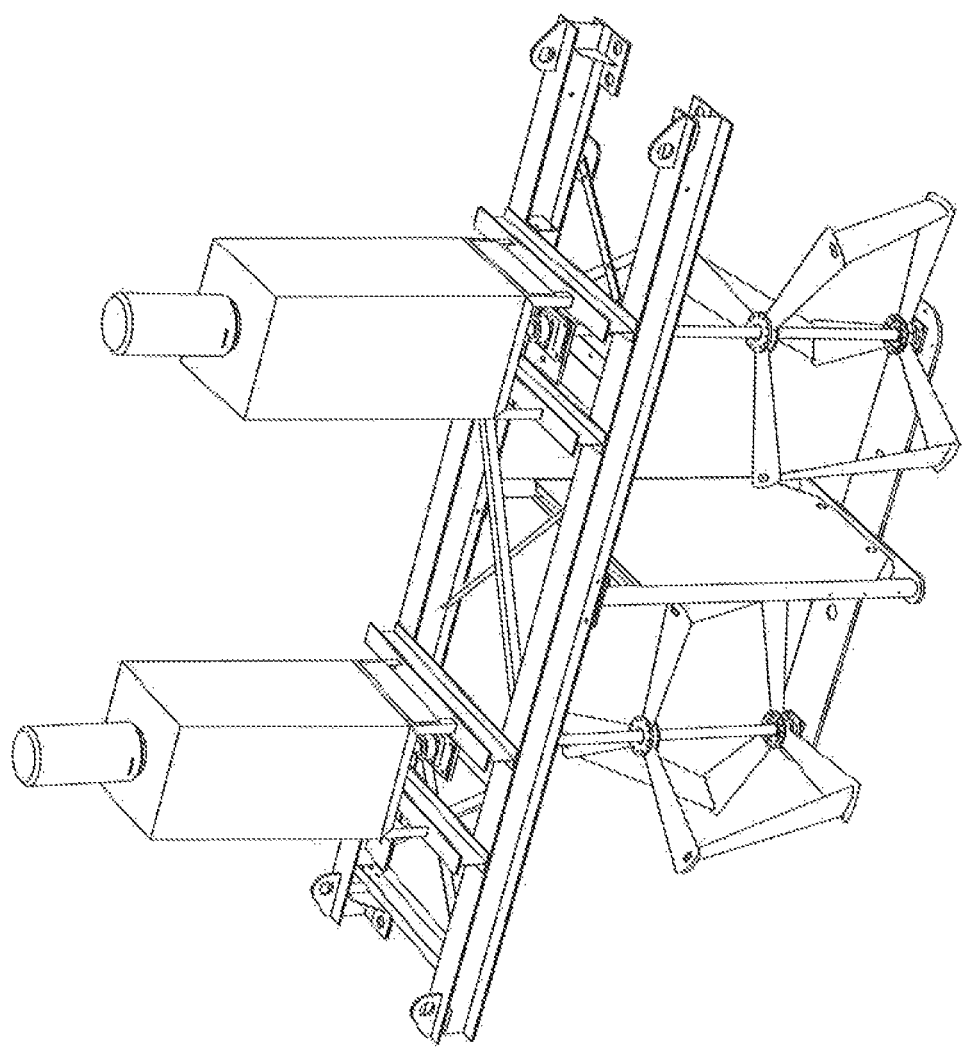
FIG. 12: A perspective view of the cassette system excluding the base and sidewalls.
Figure 13:
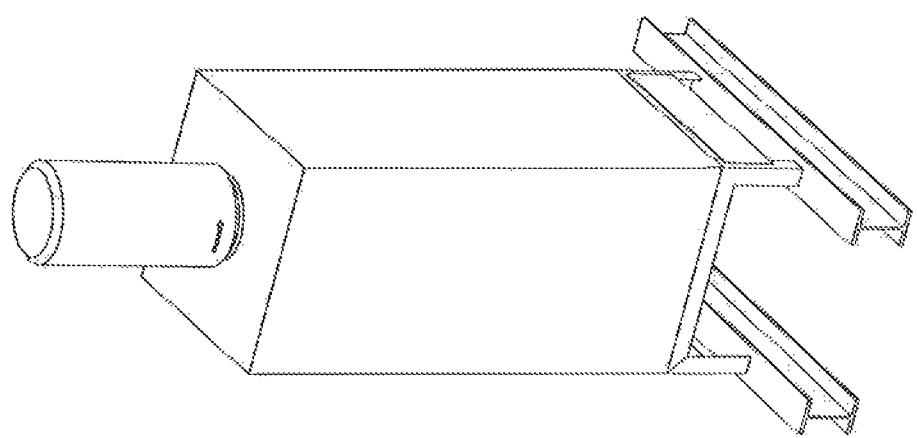
FIG. 13: A perspective view of the cassette system exemplary gear box.
Figure 14:
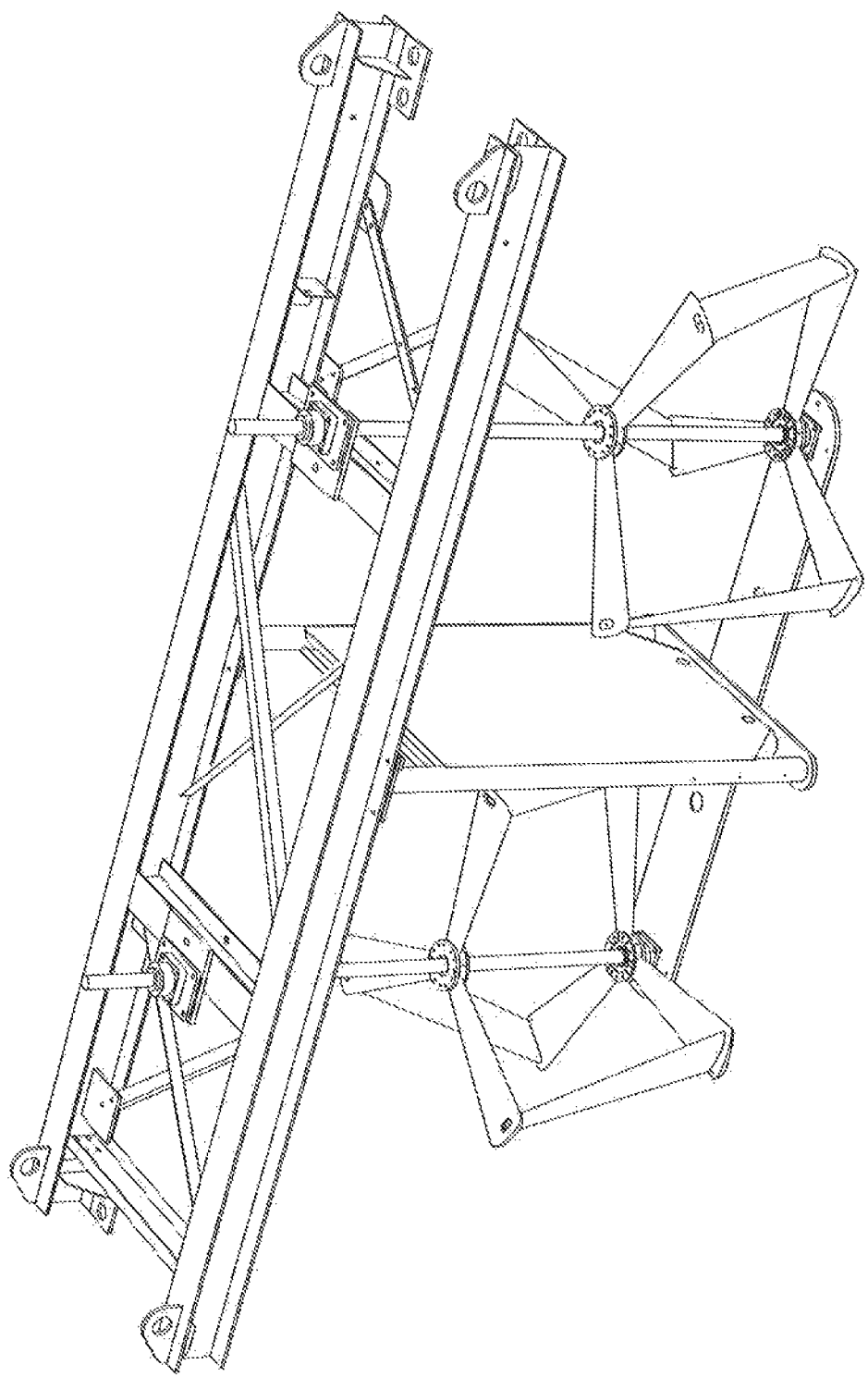
FIG. 14: A perspective view of the cassette system turbine modules and frame.
Figure 15:
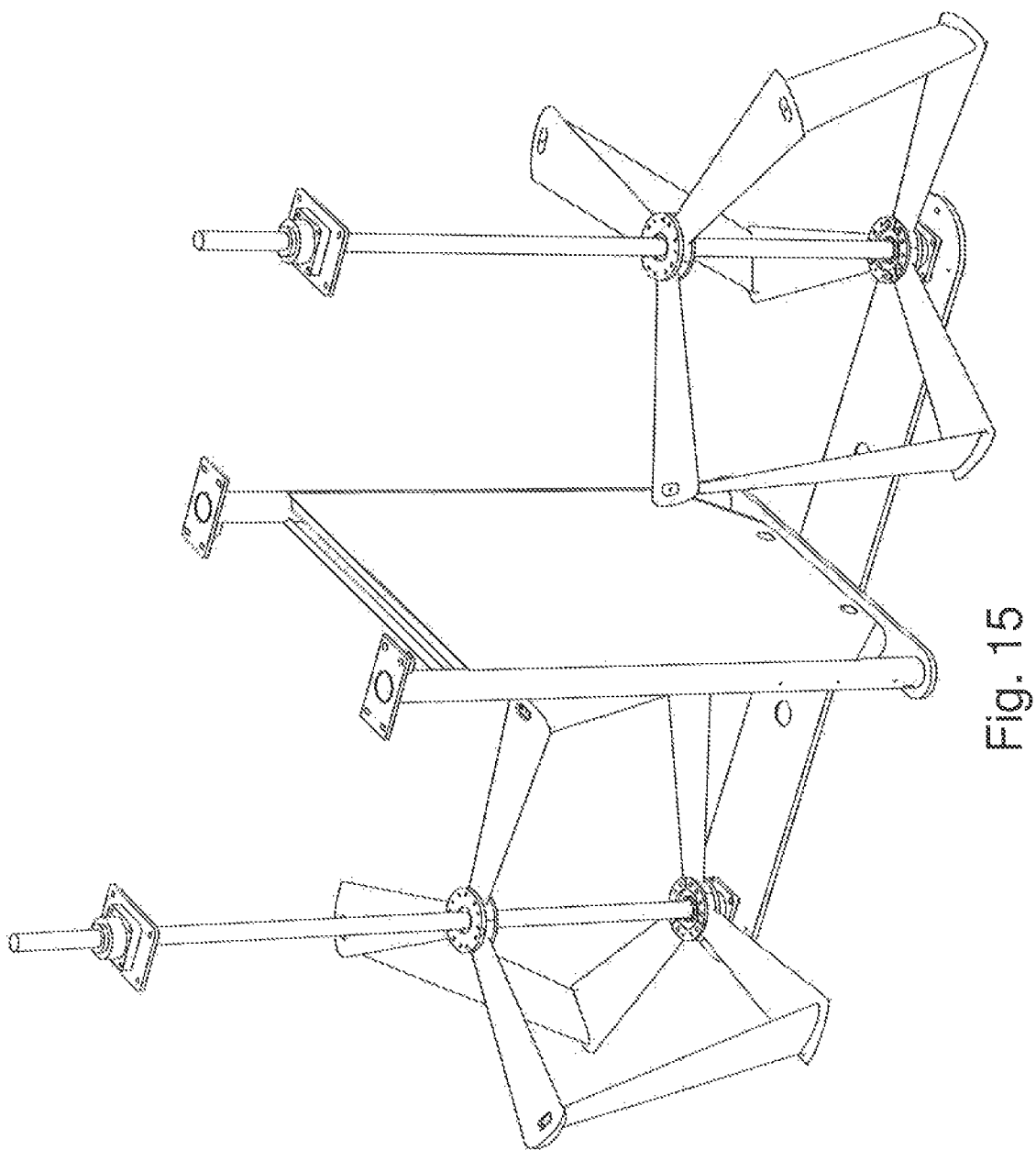
FIG. 15: A perspective view of the cassette system turbine modules.
Figure 16:
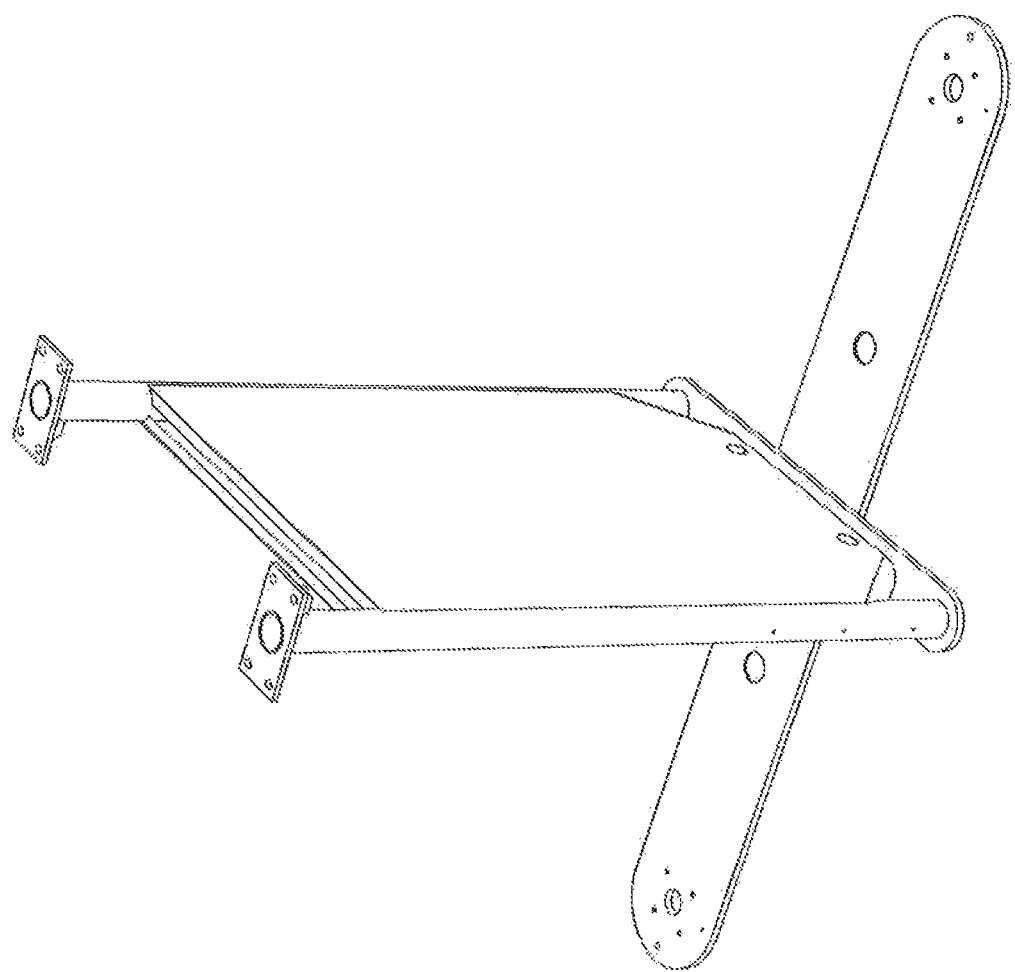
FIG. 16: A perspective view of the cassette system turbine module divider wall.
Figure 17:
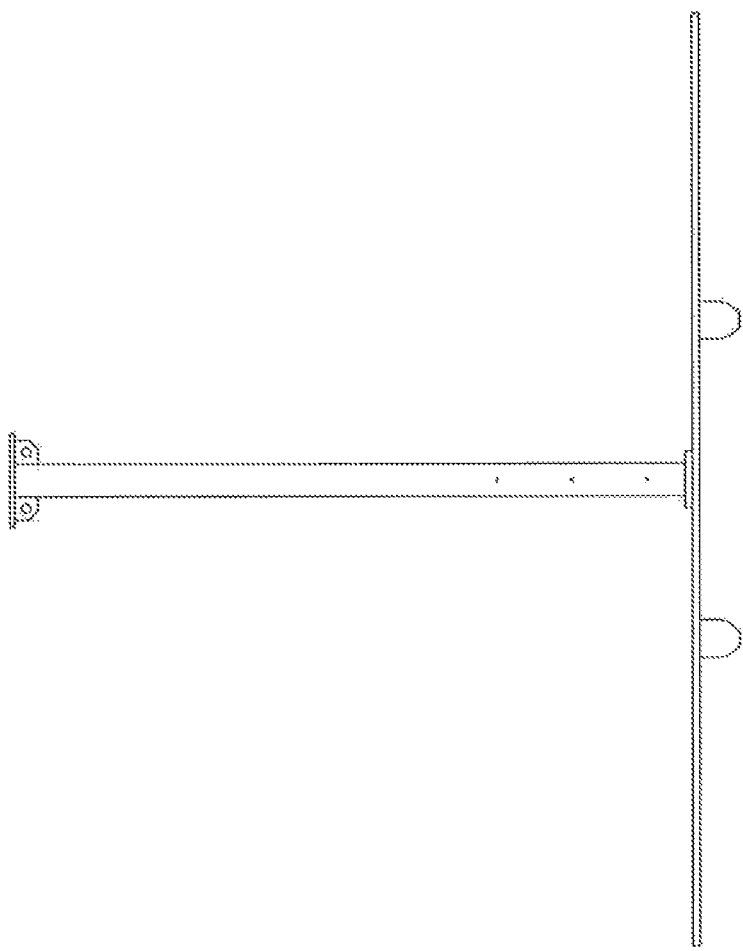
FIG. 17: A front view of the cassette system turbine module divider wall.
Figure 18:
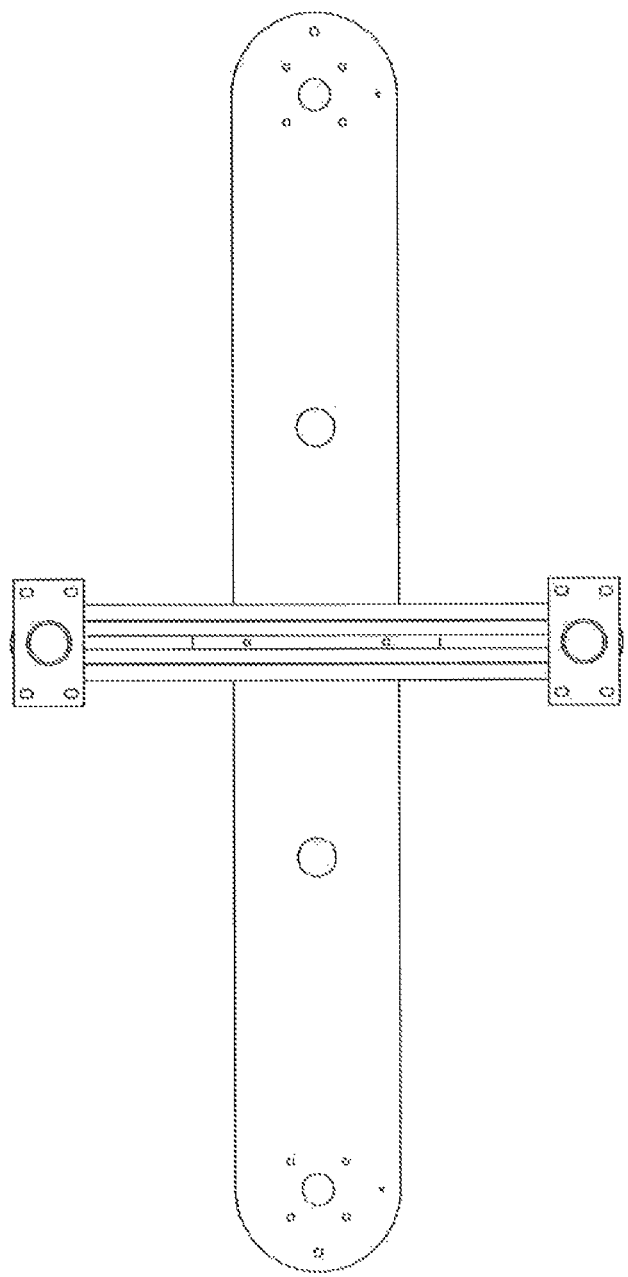
FIG. 18: A top view of the cassette system turbine module divider wall.
Figure 19:
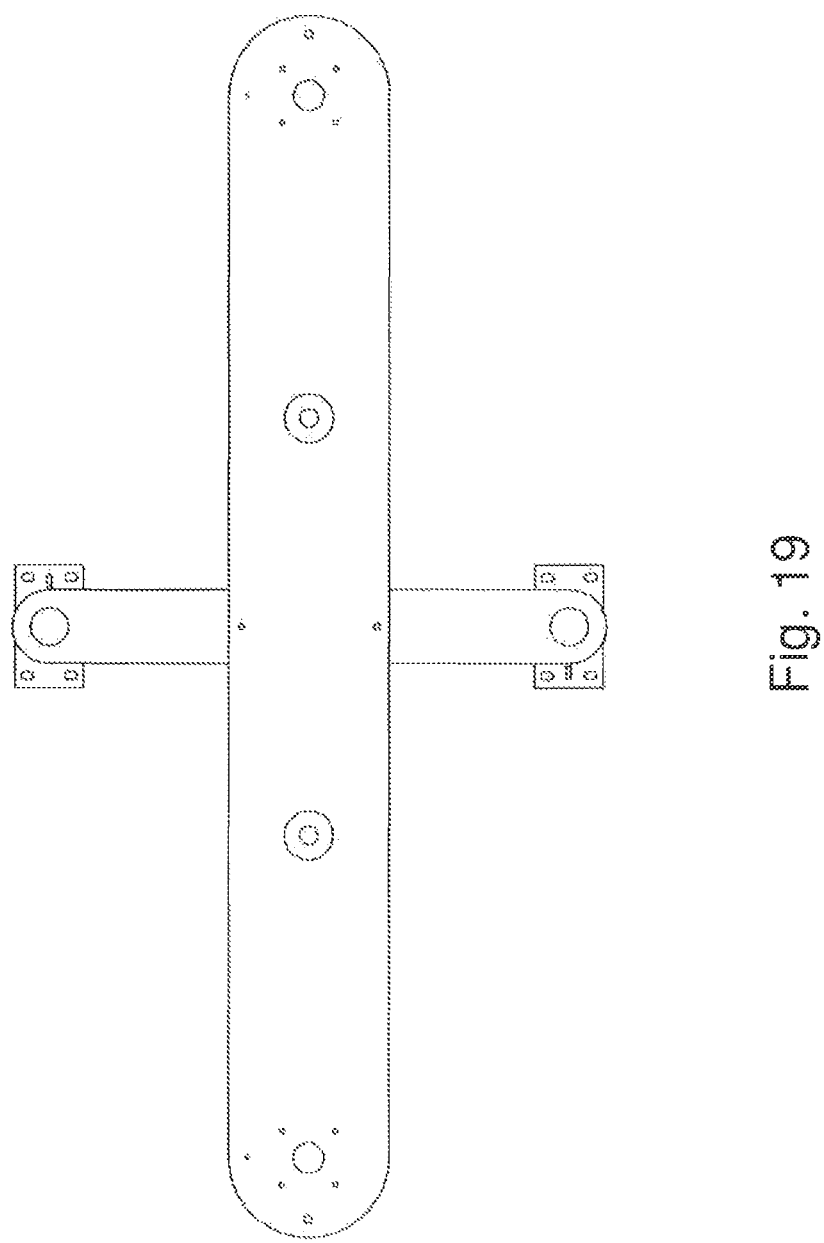
FIG. 19: A bottom view of the cassette system turbine module divider wall.
Figure 20:
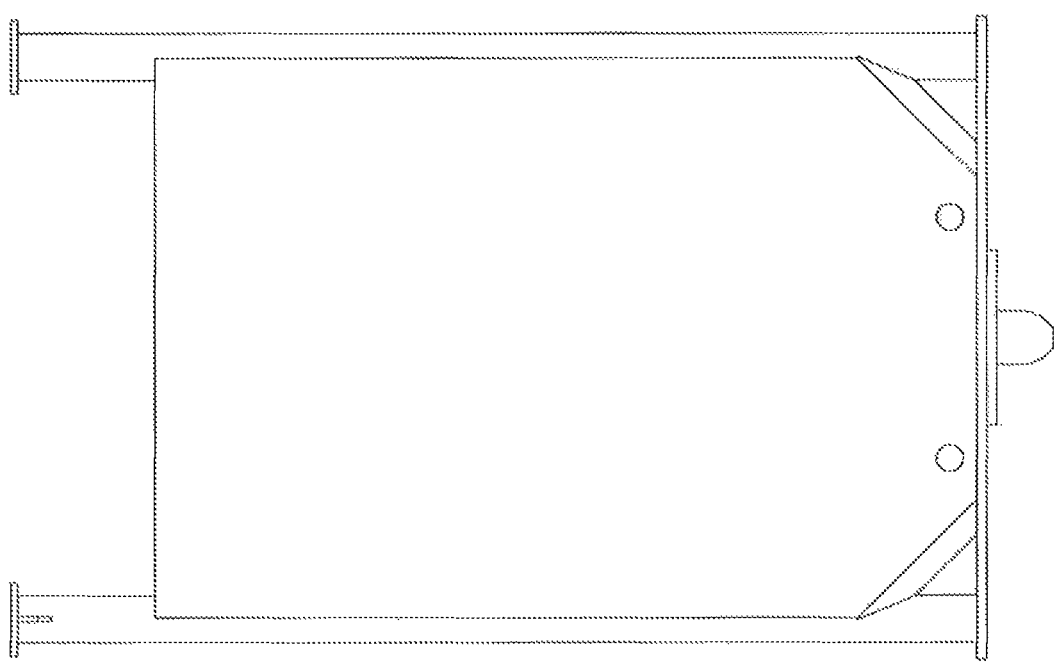
FIG. 20: A side view of the cassette system turbine module divider wall.
Figure 21:
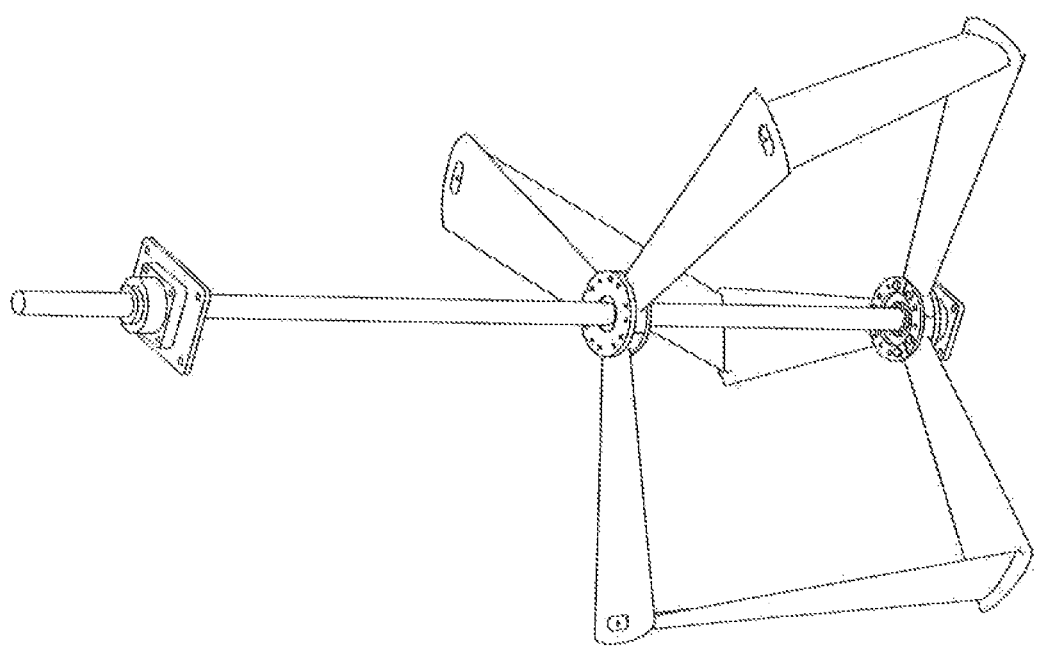
FIG. 21: A perspective view of the cassette system turbine blade.
Figure 22:
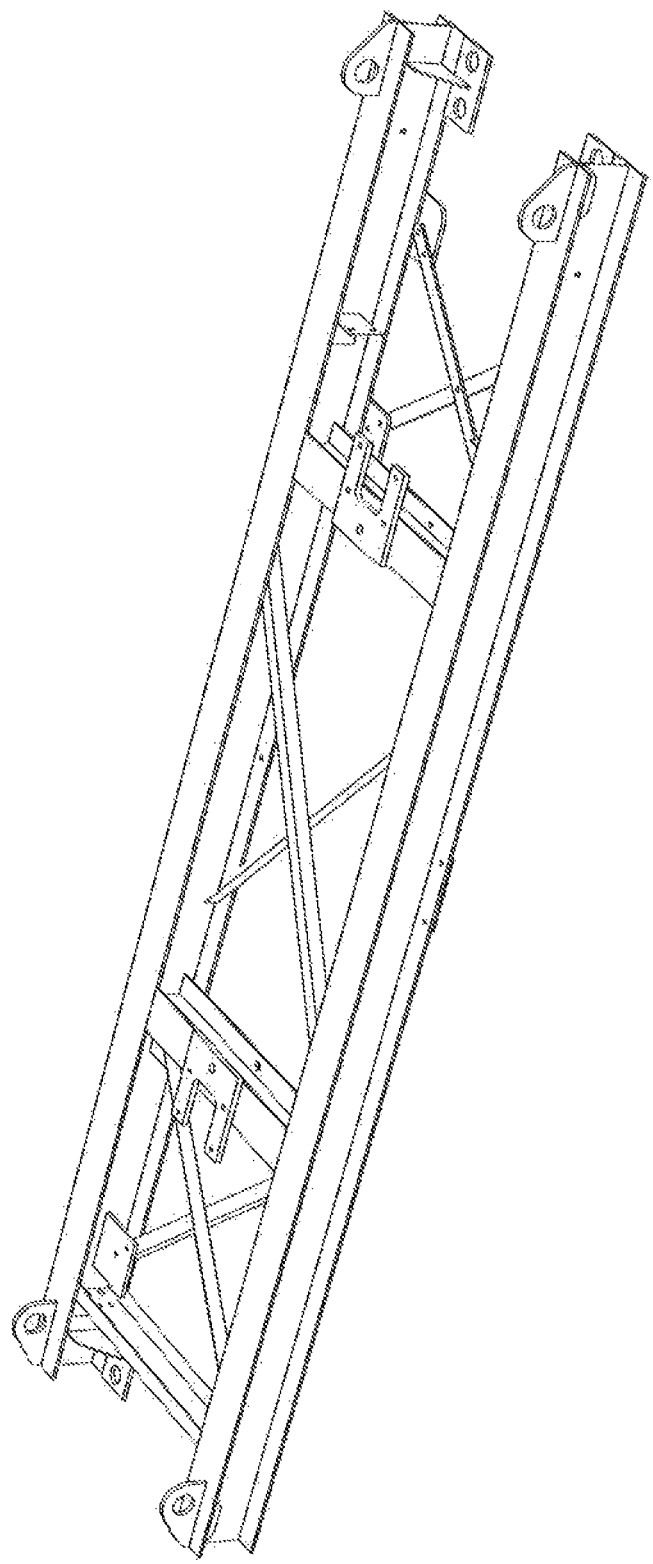
FIG. 22: A perspective view of the cassette system support frame.
Figure 23:
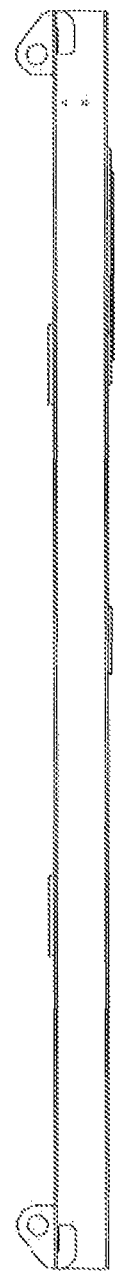
FIG. 23: A front view of the cassette system support frame.
Figure 25:
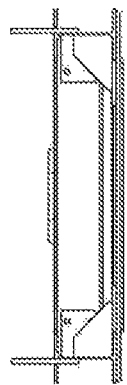
FIGS. 24-25: Side views of the cassette system support frame.
Figure 24:
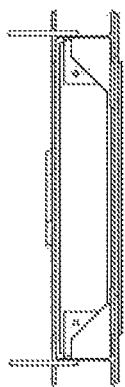
Figure 26:
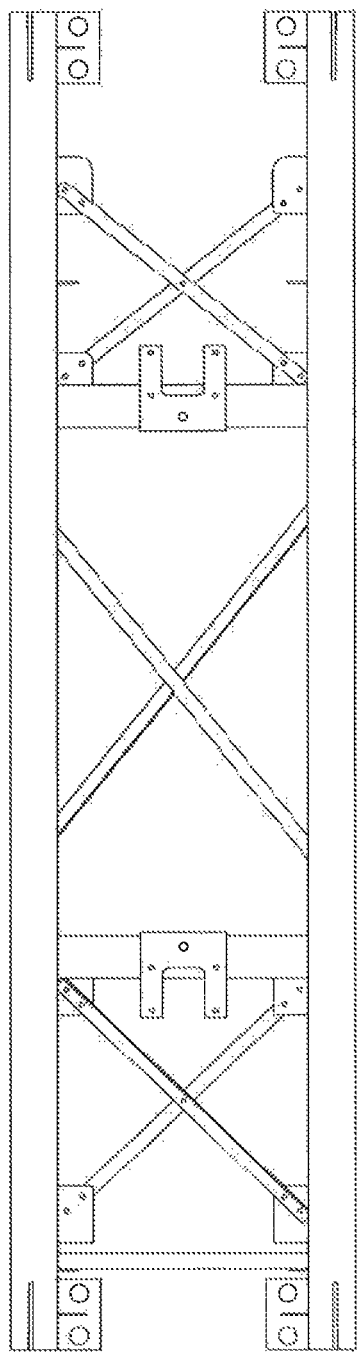
FIG. 26: A top view of the cassette system support frame.
Figure 27:
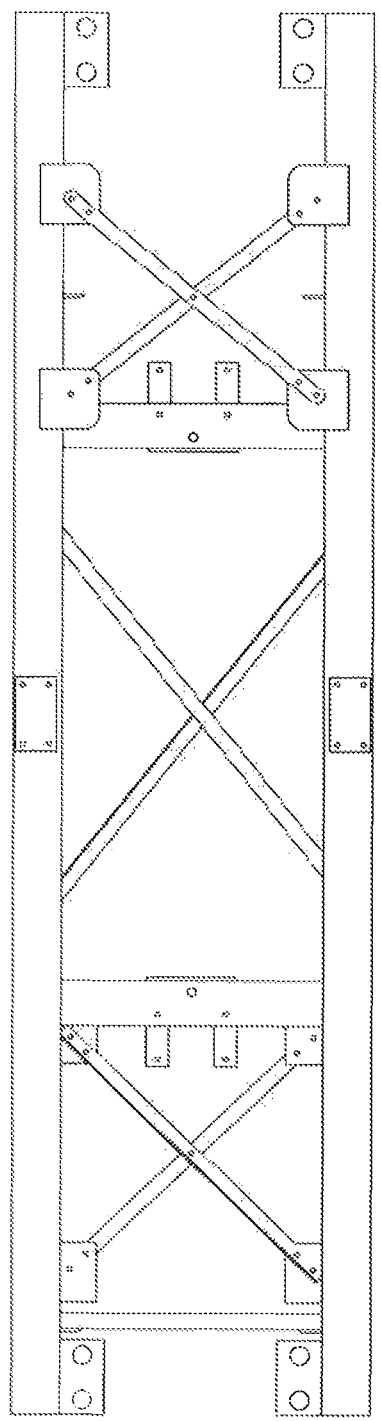
FIG. 27: A bottom view of the cassette system support frame.
Figure 28:
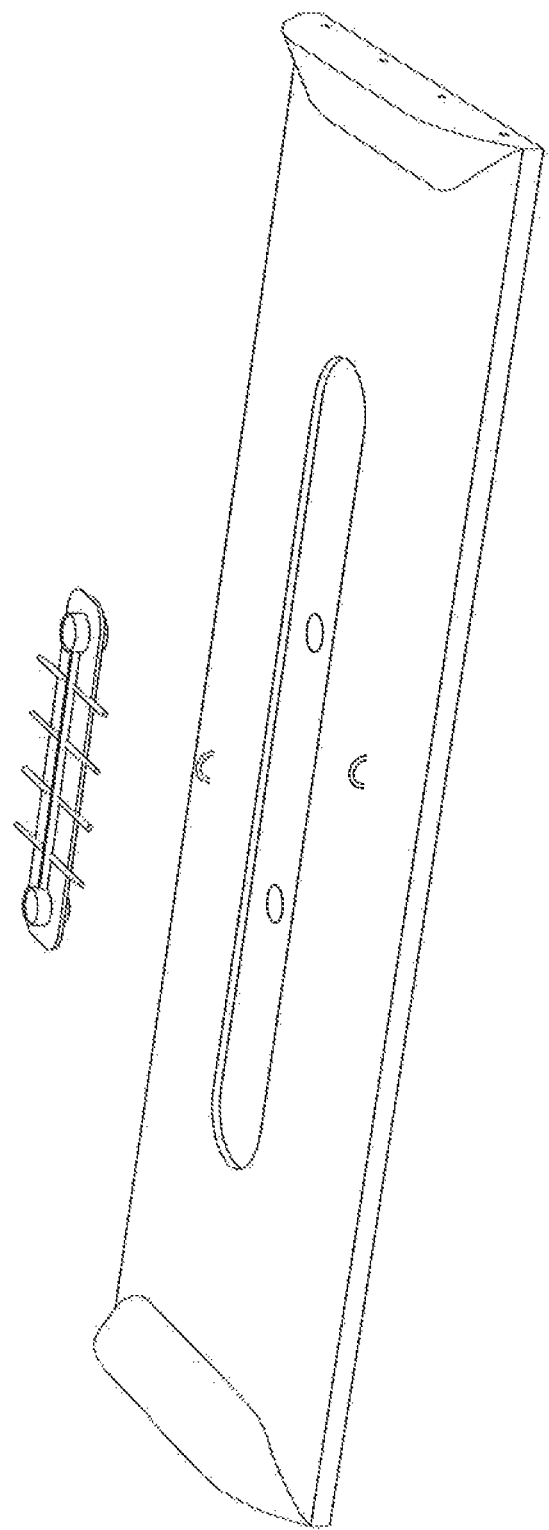
FIG. 28: A perspective view of the cassette system base and mortise insert.
Figure 29:
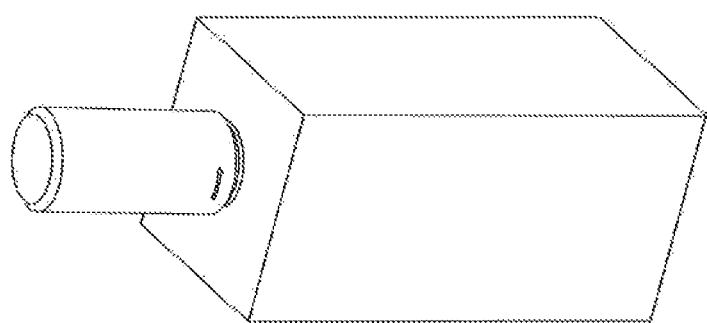
FIG. 29: A perspective view of the exemplary gear box.
Figure 32:
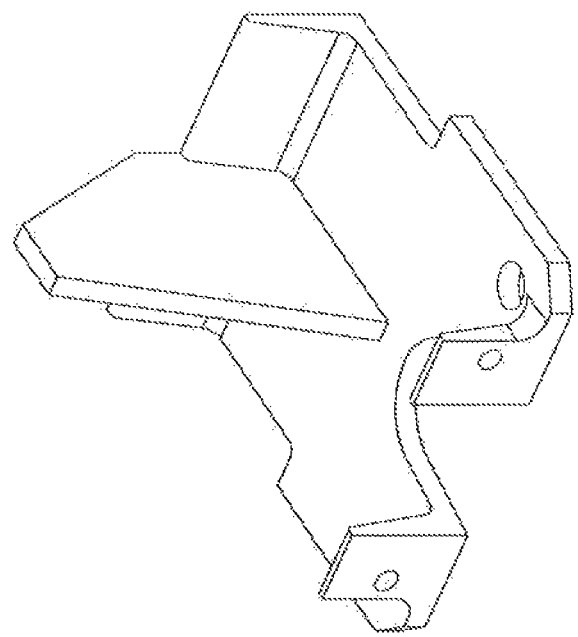
FIGS. 31-32: Perspective views of the support frame corner brackets.
Figure 31:
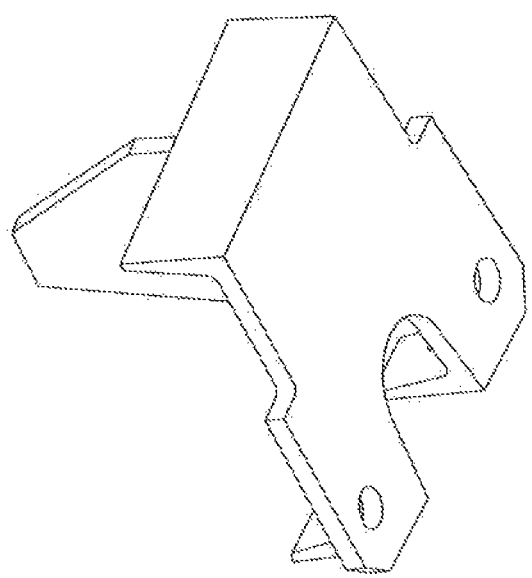
Figure 34:
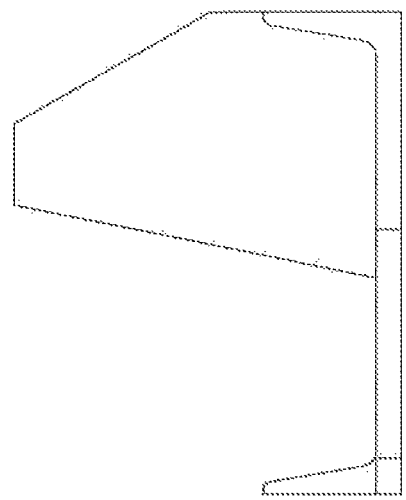
FIG. 34: A side view of the support frame corner bracket.
Figure 33:
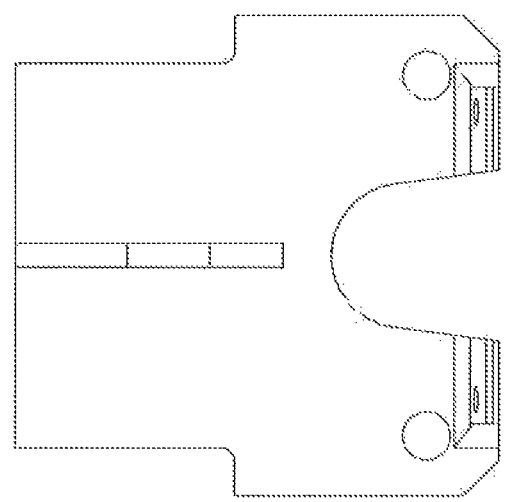
FIG. 33: A top view of the support frame corner bracket.
Figure 35:
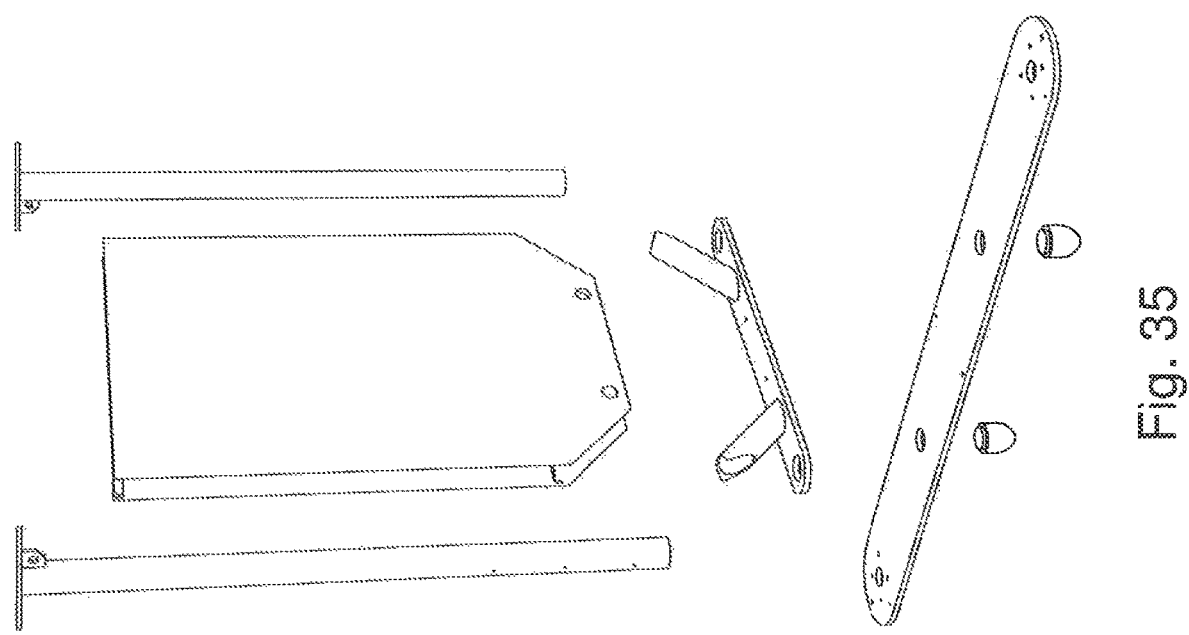
FIG. 35: A disassembled view of the cassette system turbine module divider wall and hardware.
Figure 36:
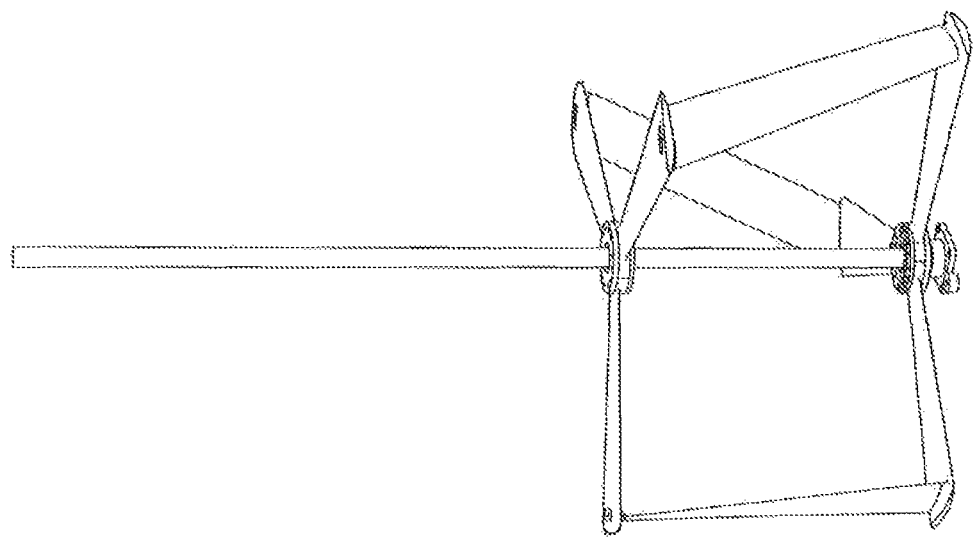
FIG. 36: A front view of an exemplary turbine.
Figure 37:
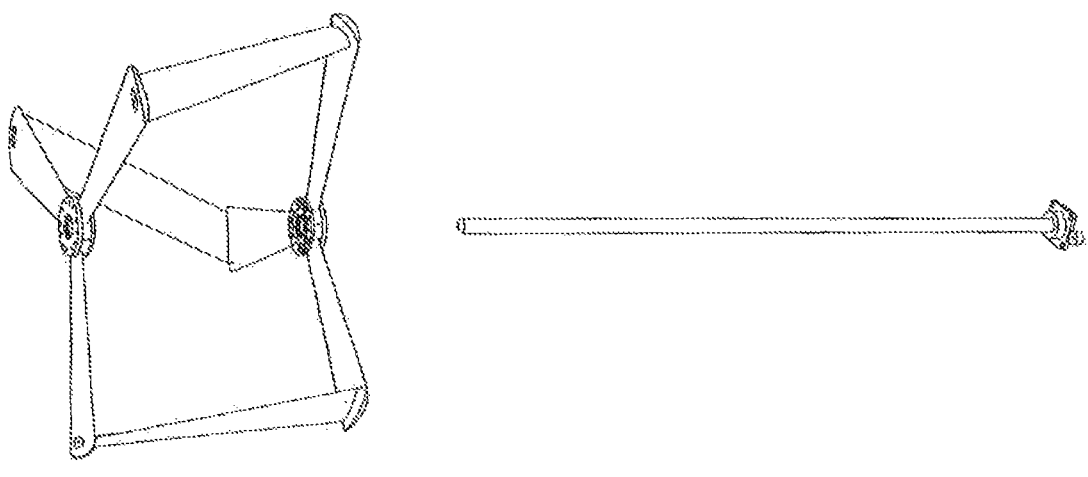
Figure 38:
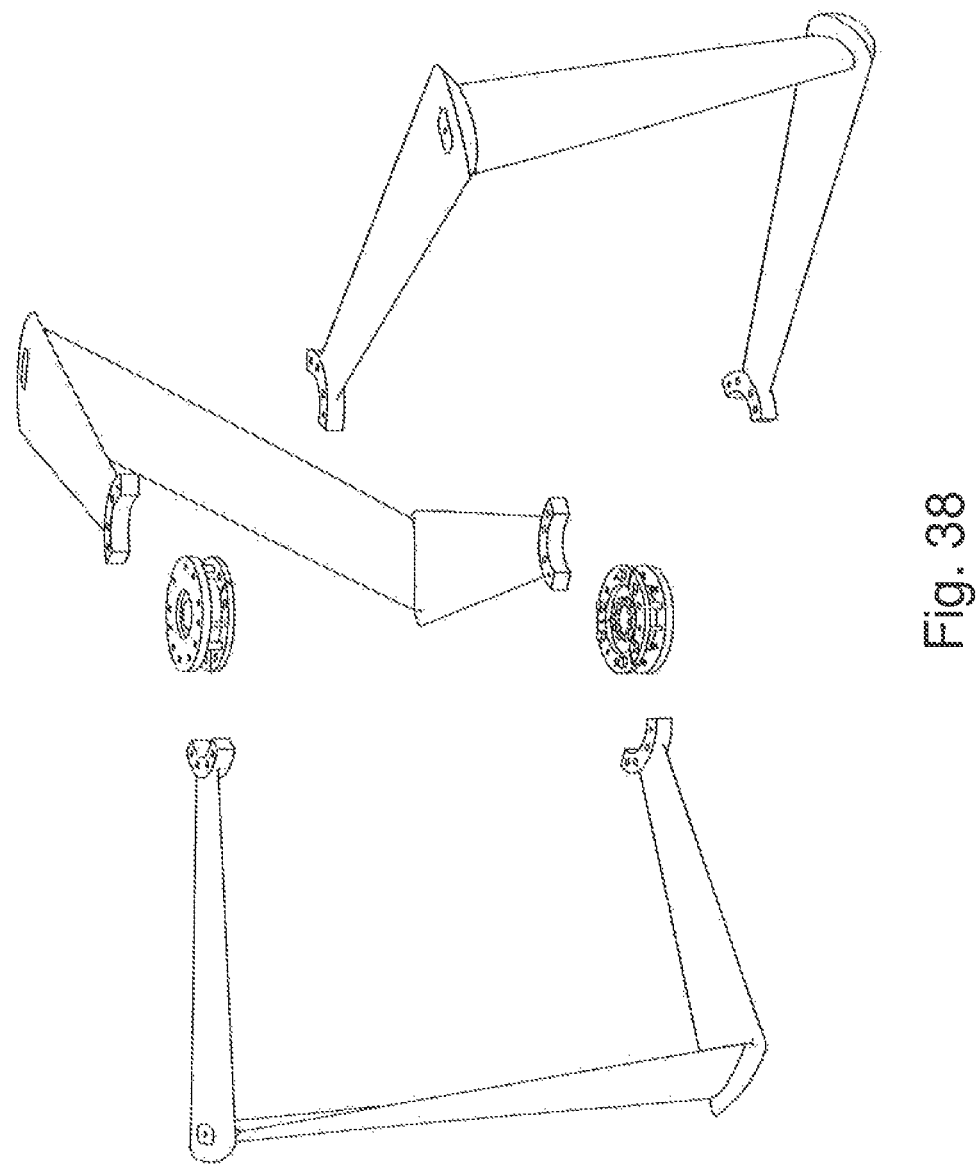

In one embodiment, FIG. 10 is a cross sectional view of the convex side wall 204, illustrating its curvature and novel features.

In various embodiments, the present apparatus may include the following features:

A. In at least one embodiment, the present apparatus includes only a single turbine. In these embodiments (and others), the present apparatus effectively includes "half" of the system shown in FIG. 4 and includes the following features: a) two concrete sidewalls that are at least partially curved to direct water to the single turbine; b) a bottom portion that at least partially slopes to direct water to the single turbine; c) brackets, mortise inserts, and the like as shown in the attached figures; and d) a gear system.

B. As will be understood from discussions herein, the single-turbine system discussed immediately above may be installed side-by-side with one or more additional single-turbine systems, such that the system may have an unlimited number of single-turbine embodiments in a side-by-side (or other) arrangement. Each single-turbine system may be operatively connected to the one or more additional single-turbine systems via fasteners, bolts, or the like.

C. As discussed above, the system may include one or more side panels 110, also known as "transitions." The transitions are further discussed in U.S. Patent Publication No. 2019/0085813, filed Sep. 17, 2018, and entitled "HYDRO TRANSITION SYSTEMS AND METHODS OF USING THE SAME", the disclosure of which is incorporated herein by reference in its entirety).

D. The apparatus discussed herein may include a substantially metal or non-concrete top to support the turbine and gear system. In various embodiments, the system described herein is installed in two stages: a) the concrete bottom and side walls are constructed and assembled (including any brackets and/or mortise inserts embedded within the concrete bottom) and are lowered into a shallow water flow (e.g., a spillway); and b) the metal top, turbines, and gear system are lowered onto and operatively connected with the concrete bottom and side walls as guided by the shapes of the one or more brackets and mortise inserts.

E. As mentioned above, the system, in at least one embodiment, includes one or more mortise inserts. In particular embodiments, the one or more mortise inserts are metal (or another suitable material) and are installed within the concrete bottom of an apparatus discussed herein. In these embodiments (and others), the turbines include knobs and/or other protrusions that are received by the mortise insert at corresponding and appropriately shaped cavities/openings.

F. In particular embodiments, the system includes two turbines and the two turbines are connected by a metal plate at the bottom of the turbines. In these embodiments (and others), the metal plate operatively connects with the mortise insert during installation of the apparatus.

G. As will be understood from discussions herein, the present apparatus may be custom-sized (in width and/or height) for the channel/waterway for which it is to be installed.

H. In some embodiments, the present systems may include a top portion formed from concrete.

I. In particular embodiments, the present systems and apparatuses may be installed in any suitable way, including, but not limited to, as a single pre-assembled piece.

In further embodiments, the present systems and apparatuses may include any number of suitable electronic components (e.g., to control electricity generated by the system and transmit this electricity to other systems, collecting stations, etc.). From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

Further, as will be understood from discussions herein, the systems and methods, in one or more embodiments, include sensors and/or industrial control system s. In particular embodiments, the system may include a number of sensors for sensing forces on various components of the assembly discussed herein (e.g., on the turbine blades, walls of the assembly, etc.). In these embodiments, the system may include control logic programmed to take certain actions based on data collected from the sensors. In further embodiments, the system is configured to connect to other assemblies (e.g., a first assembly at a first location along a channel may be operatively connected to, and communicate with, a second assembly at a second location along the channel). In still further embodiments, the system is configured to connect with one or more third-party systems (e.g., environmental, weather, water systems, etc.) for coordinating use of one or more assemblies and power production related to same.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method of installation comprising the steps of:
lowering a base of a hydroelectric turbine system into a channel, wherein the base is lowered while detached from other components of the hydroelectric turbine system and includes an obround depression on an upper surface of the base, the obround depression comprising one or more circular cavities exposing one or more sockets of a mortise insert, wherein the mortise insert is embedded within the base and comprises a metal spine extending a length less than the total length of the mortise insert, and further comprising a plurality of support ribs perpendicular to the metal spine for securely embedding the mortise insert within the base; and lowering a base plate into the obround depression formed by the base wherein a perimeter of the base plate is contained completely within the obround depression, and wherein the base plate is operatively connected to one or more turbine rotors and includes downwardly protruding knobs to be accepted by the sockets.

2. The method of claim 1, wherein lowering the base of the hydroelectric turbine system comprises hoisting and lowering the base via a crane.

3. The method of claim 2, wherein the base is manufactured from a cement mixture.

4. The method of claim 3, wherein the base comprises one or more integrated hooks operable to support the weight of the base in a hoisted position.

5. The method of claim 1, wherein the mortise insert is manufactured from metal or a composite material.

6. The method of claim 1, further comprising the step of securing a left and right side wall to a left and right side of the base, respectively.

7. The method of claim 6, further comprising the step of securing a top frame to the left and right side walls, wherein the top frame extends across the length of the base and secures the one or more turbine rotors between the base and the top frame.

8. A shallow waterway turbine system comprising:
a rectangular base constructed of a cement mixture defining an obround depression, wherein:
the rectangular base comprises an embedded mortise insert;
the mortise insert comprises a metal spine and a plurality of support ribs for securing the mortise insert within the base;
the mortise insert further comprises one or more sockets; and
the obround depression comprises one or more circular cavities exposing one or more sockets of the mortise insert; and a base plate, wherein:
the base plate is manufactured of a metal and includes knobs for being accepted by the one or more sockets;
the base plate is operatively connected to one or more turbine rotors; and
a perimeter of the base plate is contained completely within the obround depression.

9. The system of claim 8, wherein the rectangular base is hoisted and lowered via a crane into a waterway.

10. The system of claim 9, wherein the rectangular base comprises one or more integrated hooks operable to support the weight of the rectangular base in a hoisted position.

11. The system of claim 8, wherein the mortise insert is manufactured from metal or a composite material.

12. The system of claim 8, wherein a left and right side wall are secured to a left and right side of the rectangular base, respectively.

13. The system of claim 12, wherein a top frame is secured to the left and right side walls, wherein the top frame extends across the length of the rectangular base and secures the one or more turbine rotors between the base plate and the top frame.

14. A shallow waterway turbine system comprising:
a rectangular base constructed of a cement mixture comprising:
an obround depression comprising one or more circular cavities for exposing one or more sockets of an embedded mortise insert; and
the embedded mortise insert comprising:
a metal spine and a plurality of support ribs for securing the mortise insert within the base; and
the one or more sockets; and
a base plate, wherein:
the base plate is manufactured of a metal and includes knobs for interfacing with the one or more sockets;
the base plate is contained completely within the obround depression; and
the obround depression completely circumscribes the base plate;
a top frame constructed of metal or metal alloy and parallel to the base;
a pair of convex sidewalls constructed of non-metal material connected to the top frame via one or more metal brackets and to the base, wherein:
the base, top frame, and pair of convex sidewalls form a module comprising a central volume; and
a midpoint of each of the pair of convex sidewalls extends into the central volume of the module; and
two turbines connected to: a) the base via the base plate and mortise insert; and b) the top frame, and extending through the central volume.

* * * * *